Aug. 1, 1944. P. F. WILBER 2,354,899
AUTOMATIC PHONOGRAPH
Filed May 31, 1941 13 Sheets-Sheet 2

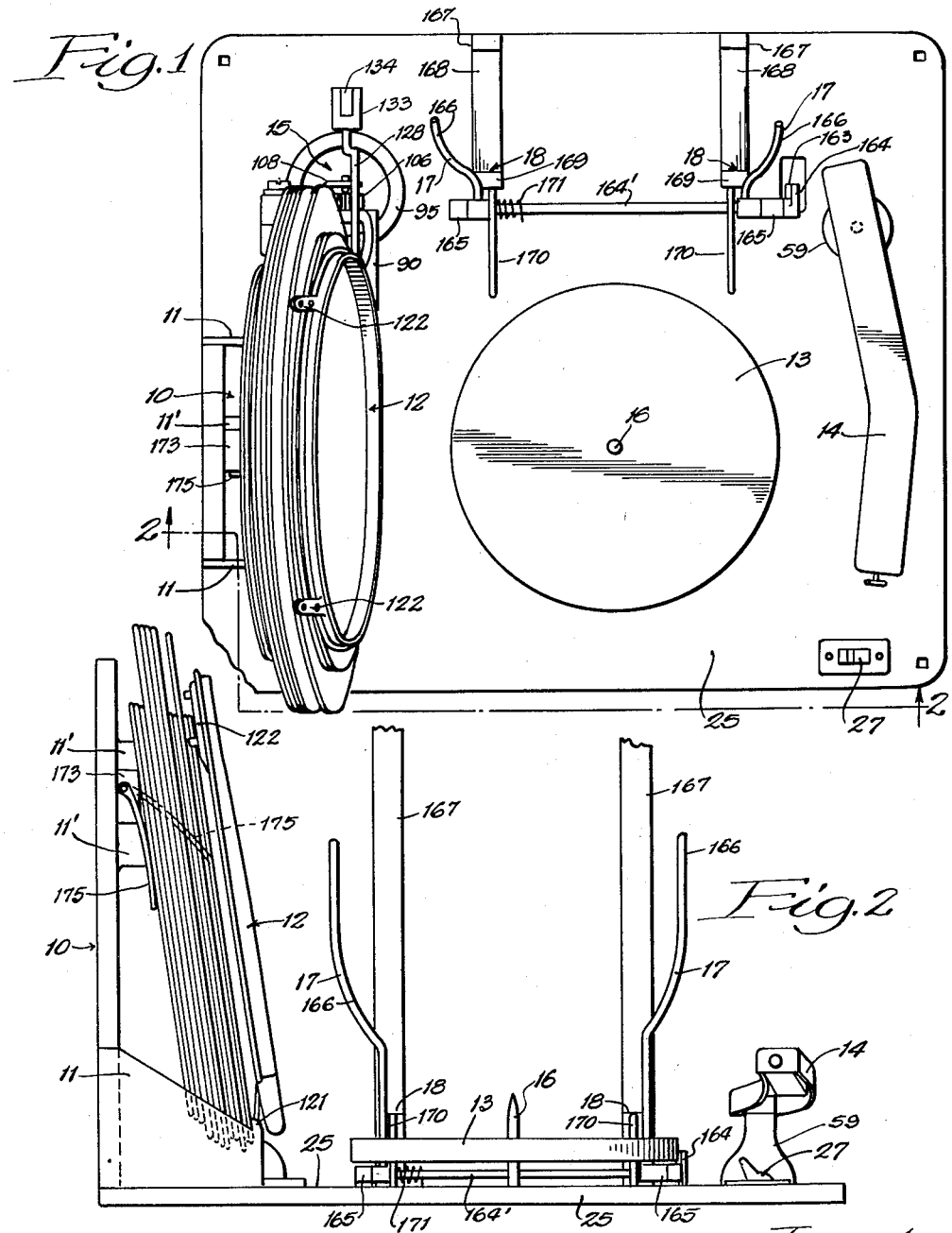

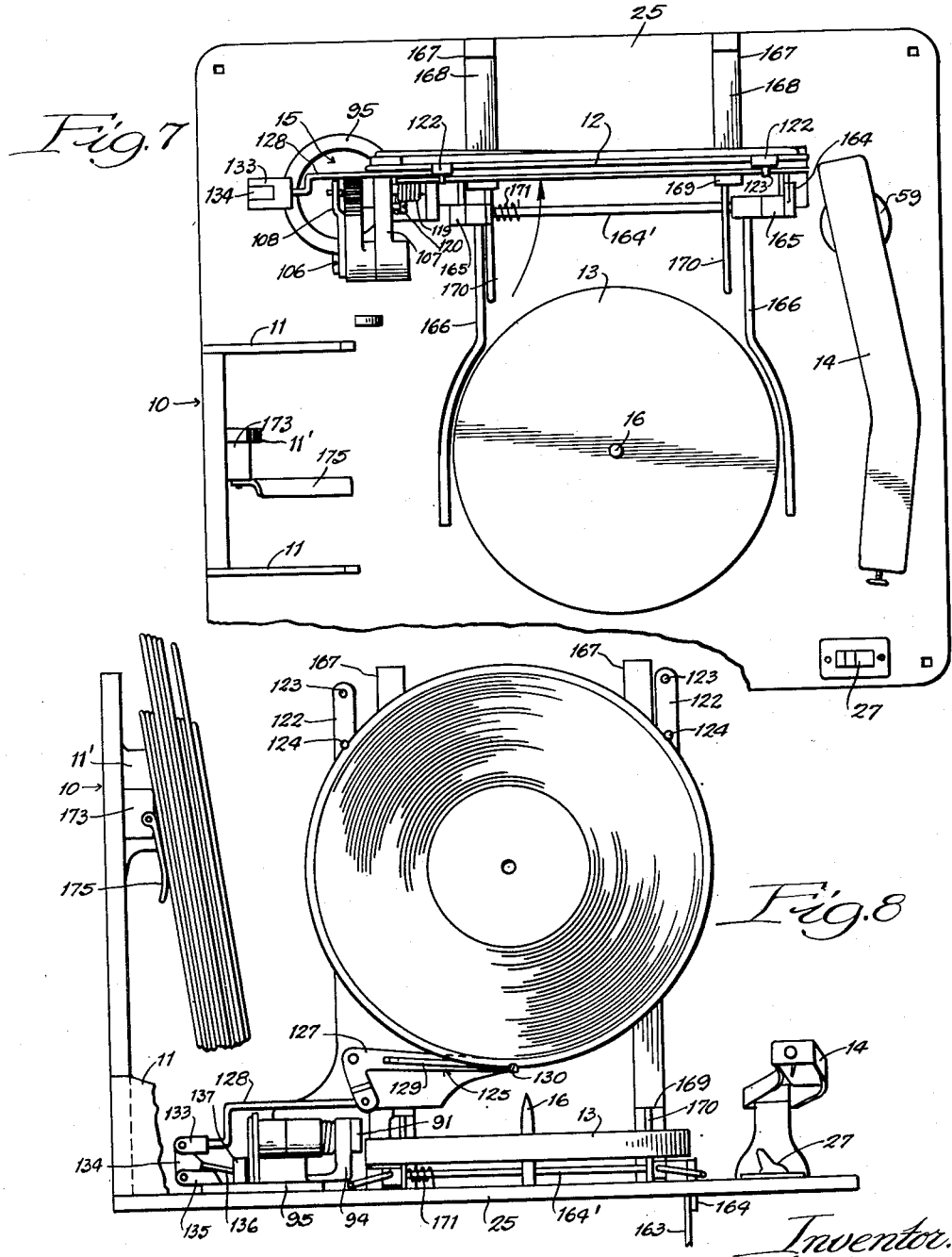

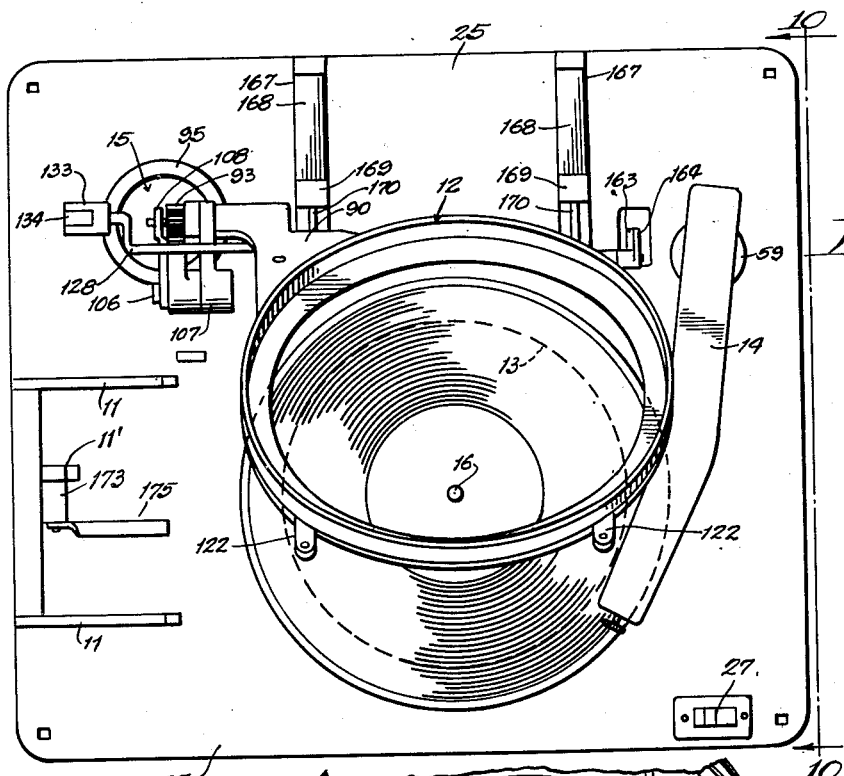
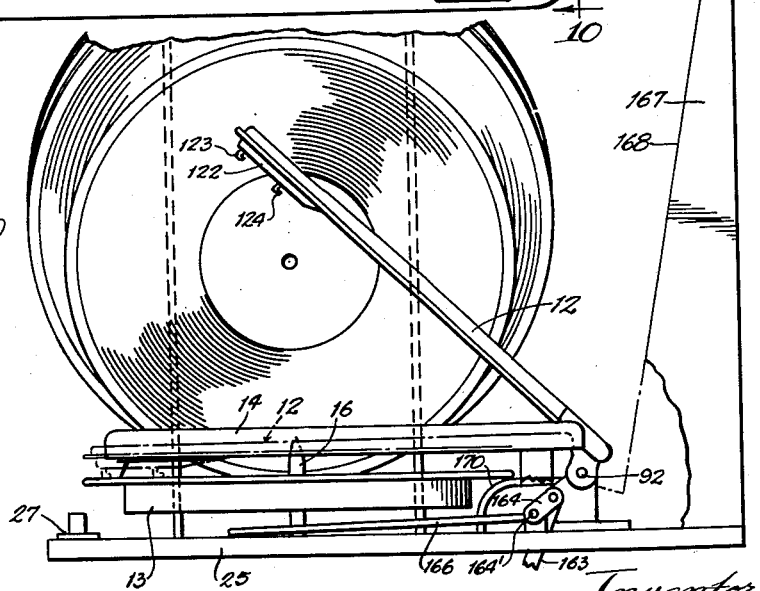

Aug. 1, 1944. P. F. WILBER 2,354,899
AUTOMATIC PHONOGRAPH
Filed May 31, 1941 13 Sheets-Sheet 6
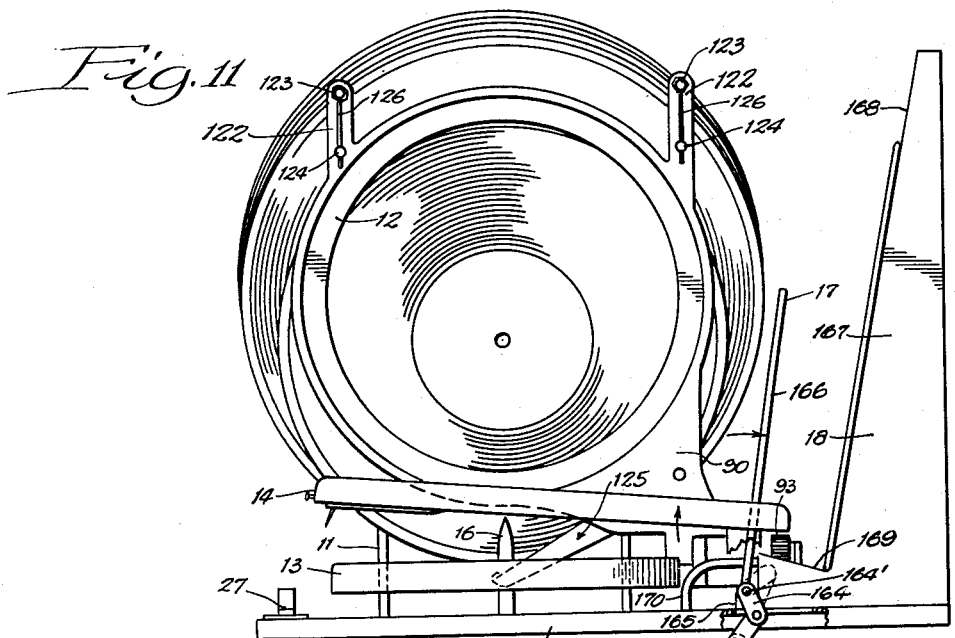
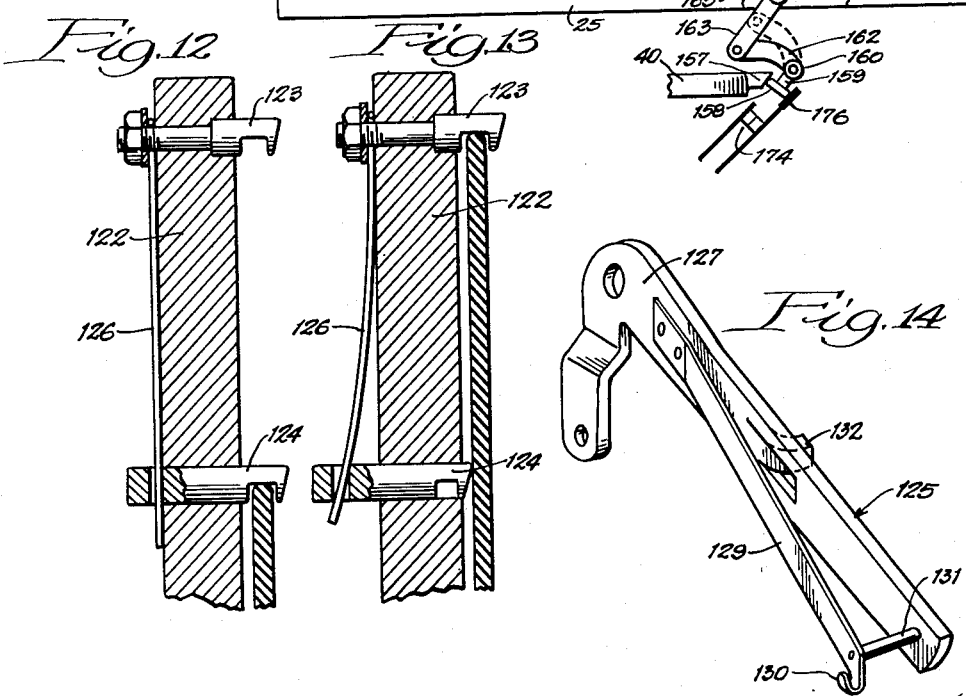
Inventor:
Paul F. Wilber.
By McCaleb, Wendt & Ray Dickinson,
Attorneys.

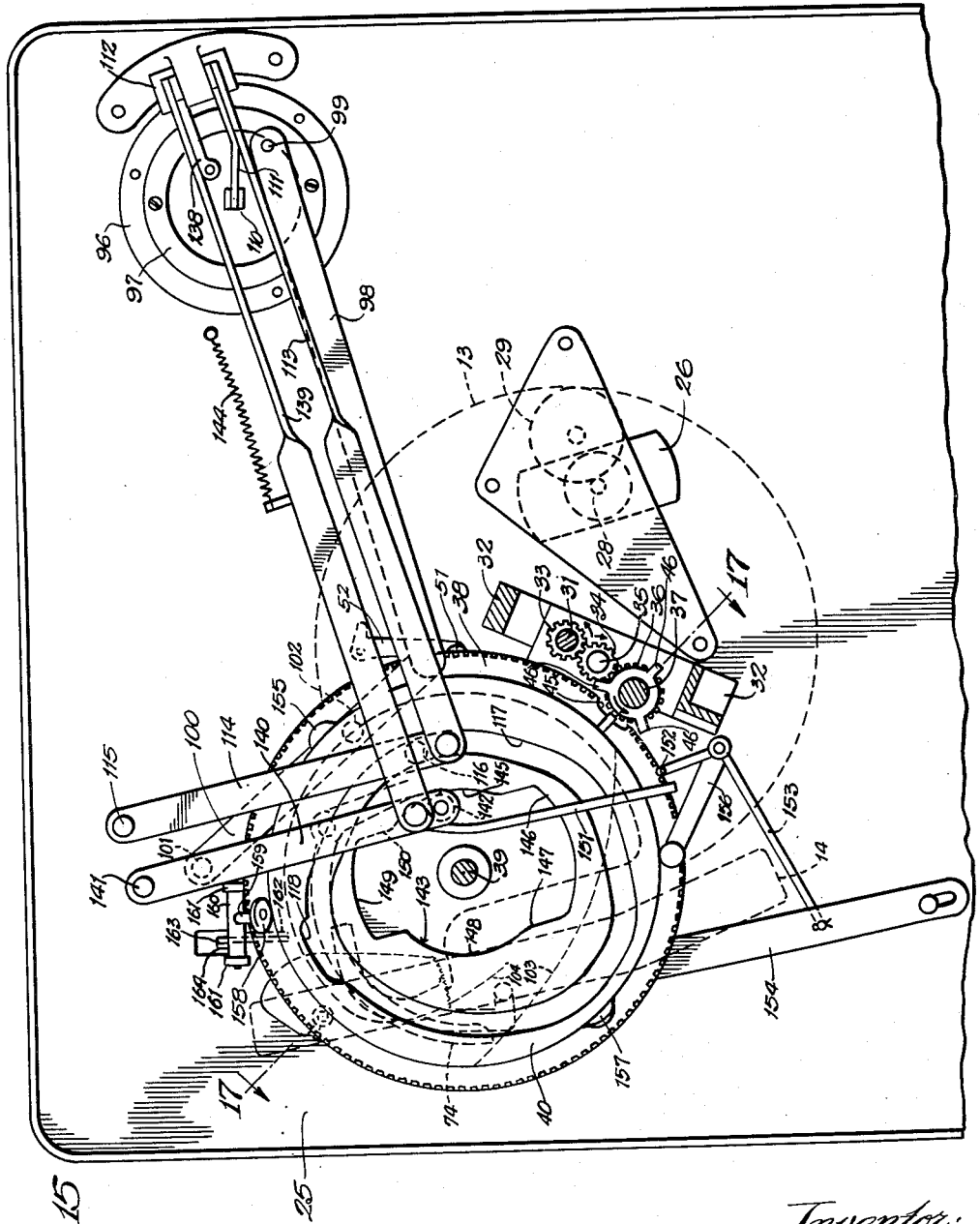

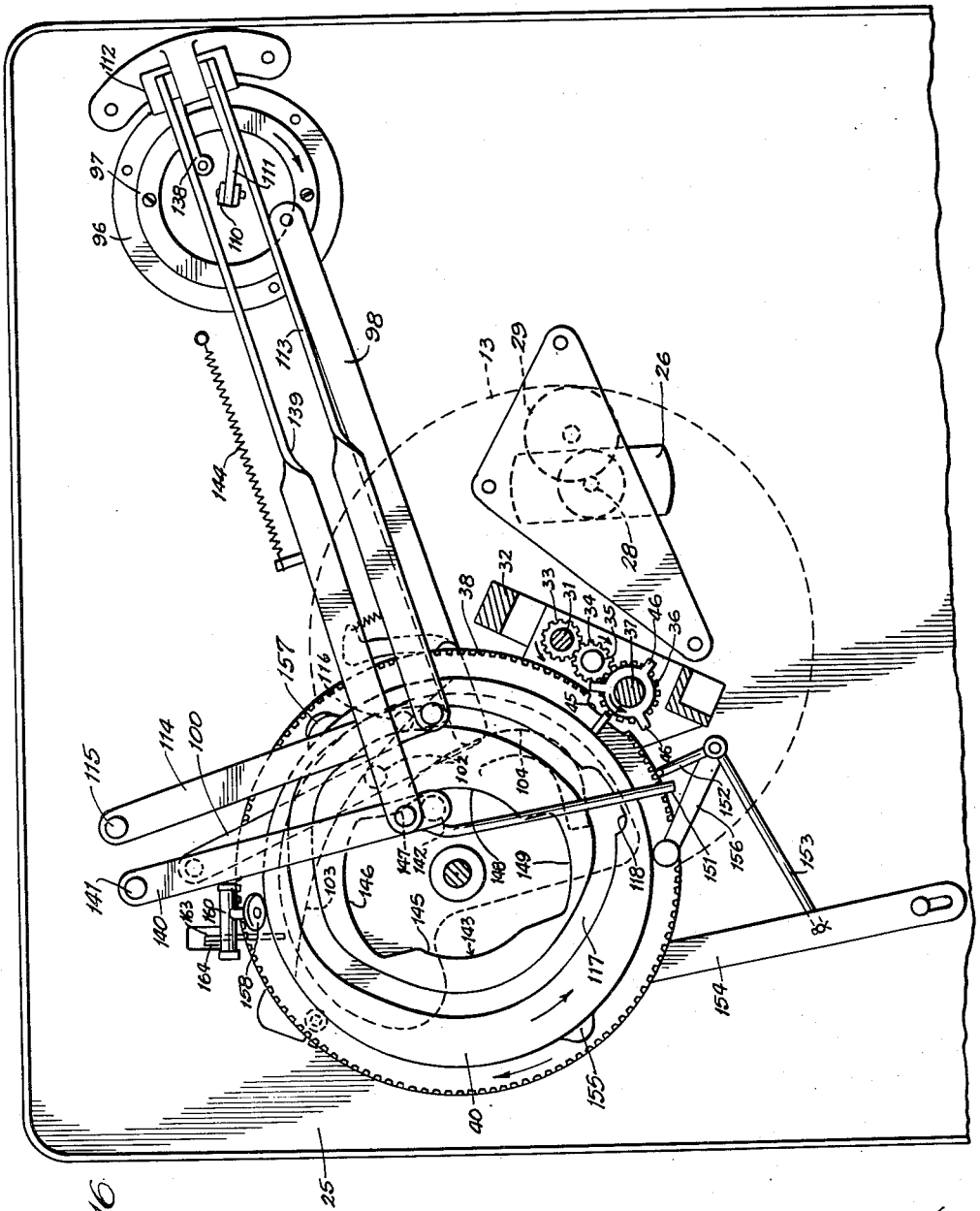

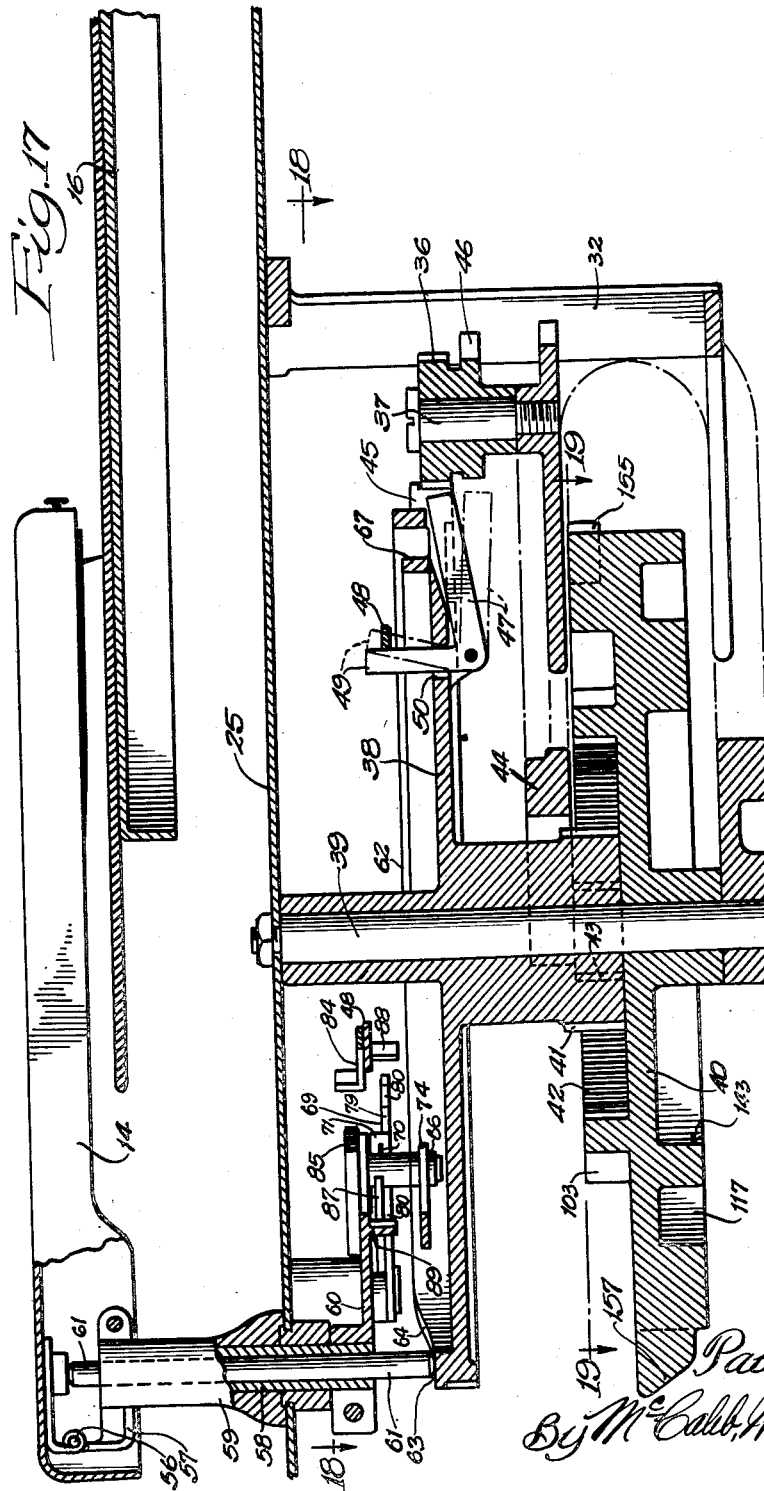

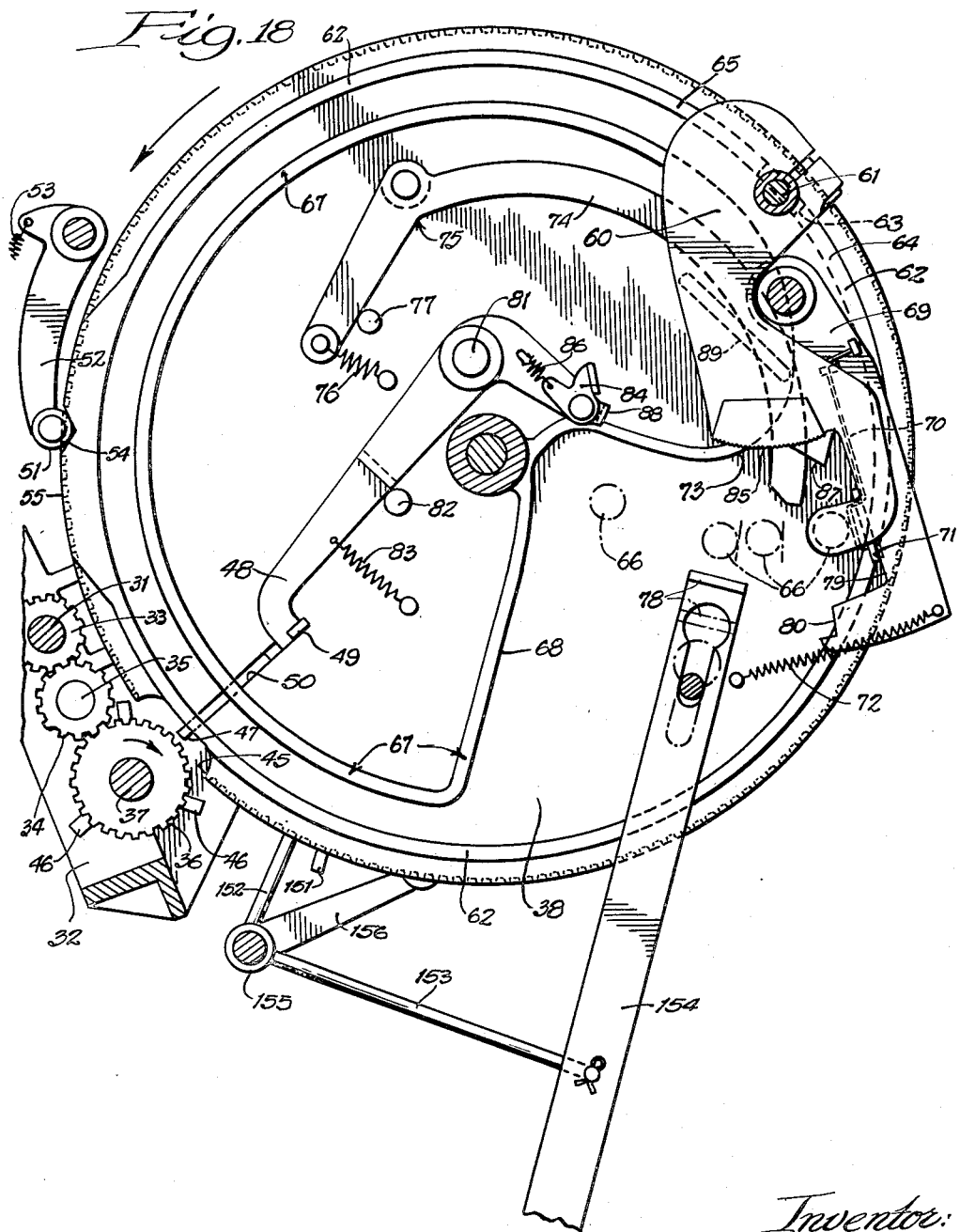

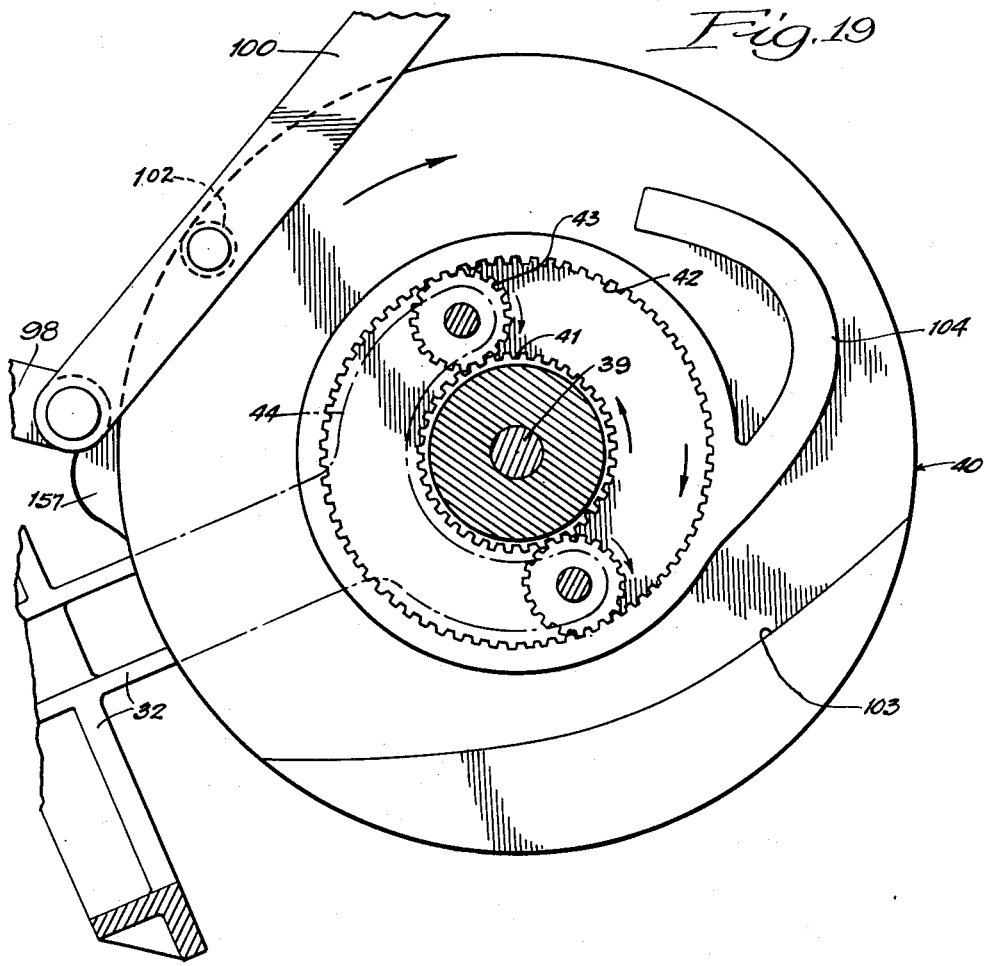

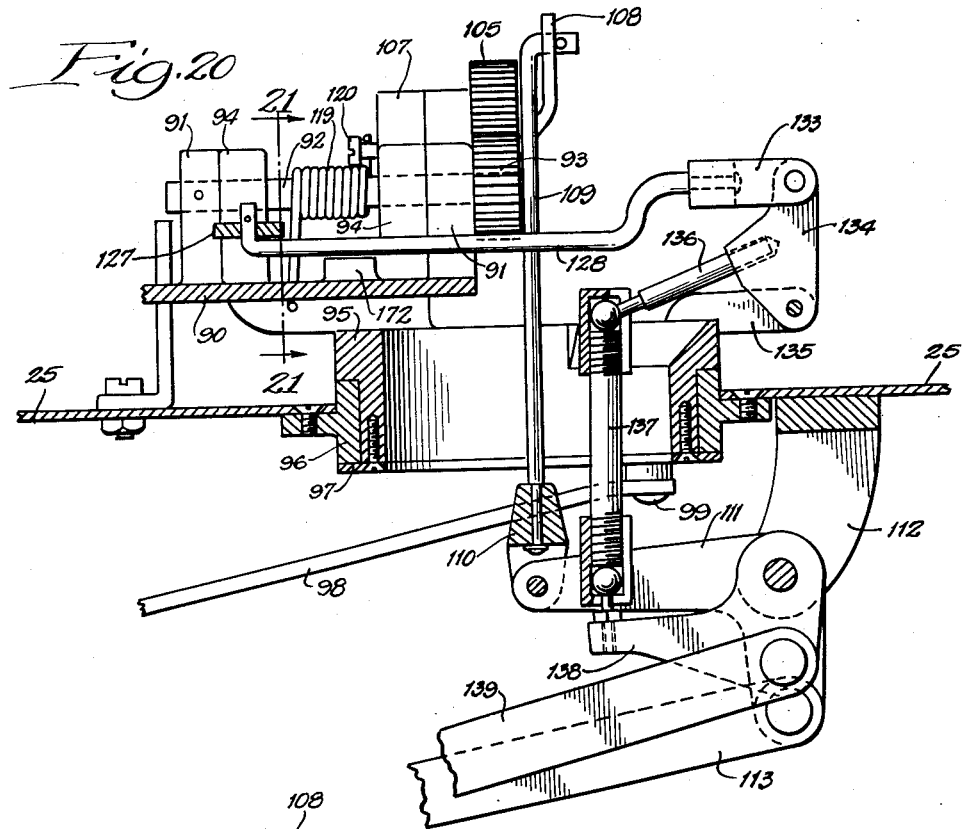
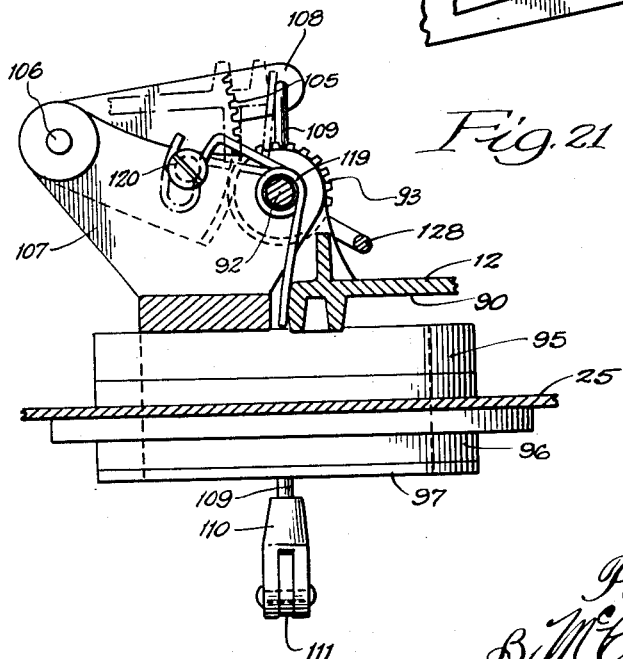

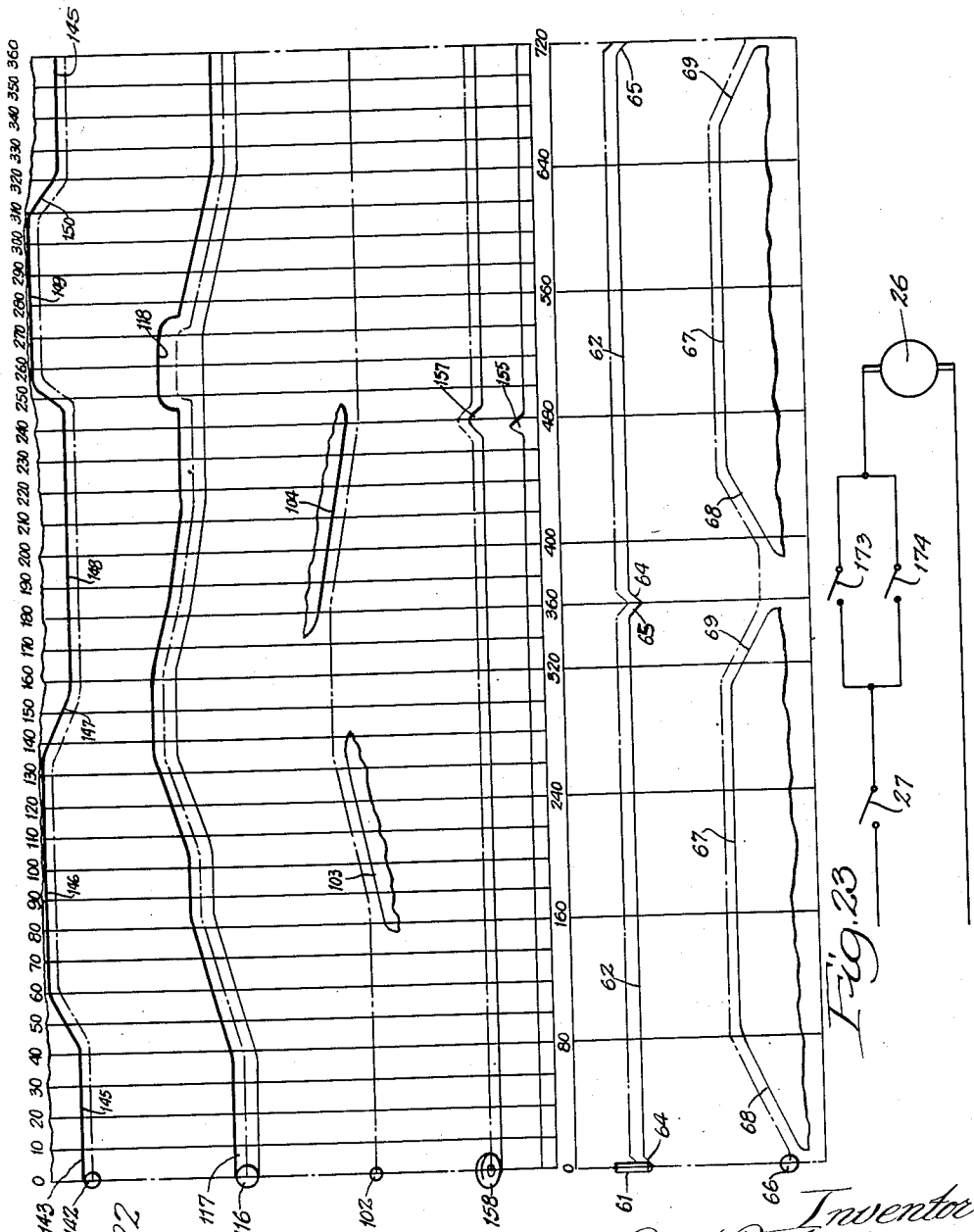

Patented Aug. 1, 1944

2,354,899

UNITED STATES PATENT OFFICE 2,354,899

AUTOMATIC PHONOGRAPH

Paul F. Wilber, Richland, N. Y.

Application May 31, 1941, Serial No. 395,974

22 Claims. (Cl. 274—10)

This invention relates to automatic phonographs and has for its principal object the provision of an improved automatic phonograph which will play both sides of a repertoire of double-sided records.

A further object of the invention is to provide an improved phonograph of this type which will play mixed records of different conventional sizes, or records of any one conventional size.

A further object of the invention is to provide an improved simplified phonograph of this general type which plays one side of a record, the other side of the same record, and then plays successive records in the same manner.

A further object of the invention is to provide a simple phonograph of this type which contains few parts and which can be economically manufactured.

A further object of the invention is to provide an improved phonograph of this type which can be very easily loaded and unloaded, the stack of records to be played being merely placed as a stack in a magazine, and the played records being likewise readily removable as a stack.

Other objects, advantages and capabilities will appear from the following description of a preferred embodiment thereof, taken in conjunction with the accompanying drawings, in which:

Figure 1 is a plan view of my improved phonograph with the transporting frame in position to engage a record in the magazine and the discarding frame in its momentary operative position to discard a record into the discard magazine.

Figure 2 is a front elevational view with the mechanism in the relation shown in Figure 1.

Figure 7 is a plan view of the phonograph showing the transporting frame in the position into which it moves before returning the record to the turntable for the playing of the other side.

Figure 8 is a corresponding front elevation.

Figure 9 is a plan view of the phonograph, the transporting frame being shown in the position it occupies during the playing of the second side of the record.

Figure 10 is a corresponding side elevation of the phonograph as viewed from the right. This view shows the transporting frame in full lines in the position it occupies during the playing of the second side of the record, the position of the transporting frame when dropping the record onto the turntable being shown in dot-and-dash lines.

Figure 11 is a side elevation as viewed from the right, showing the phonograph in the same relation as in Figures 1 and 2.

Figure 12 is a sectional detail of part of the transporting frame, the section being taken on the line 12—12 of Figure 5, and the frame being shown engaging a smaller size record.

Figure 13 is a similar view showing the transporting frame engaging a larger size record.

Figure 14 is a perspective view of the latching member carried by the transporting frame.

Figure 15 is an inverted plan view showing the mechanism beneath the motor board in the relation it occupies during the playing of the first side of the record.

Figure 16 is a similar view showing the mechanism in the relation it occupies during the playing of the second side of the record.

Figure 17 is a sectional elevation of the phonograph taken on the line 17—17 of Figure 15.

Figure 18 is a fragmentary sectional plan showing the player arm cam and associated elements, the section being taken on the line 18—18 of Figure 17.

Figure 19 is a sectional plan of the lower cam, the section being taken on the line 19—19 of Figure 17.

Figure 20 is a sectional detail taken on the line 20—20 of Figure 3.

Figure 21 is a sectional detail, the section being taken on the line 21—21 of Figure 20.

Figure 22 is an expanded diagrammatic view of the various cams showing the manner in which they cooperate to effect the movements of the phonograph mechanism, and Figure 23 is a wiring diagram.

For a more complete understanding of the invention, reference is had to the accompanying drawings, the parts in the several views thereof being indicated by corresponding reference numerals.

In order to facilitate understanding of the machine as a whole, before describing the mechanical features in detail, I give a short description of the general operation of the automatic phonograph.

The records to be played are placed as a stack in a magazine 10 constituted by two spaced supports 11 and an upper support 11' against which the stack rests. As shown in Figure 2, they may be records of a plurality of conventional sizes, for example ten and twelve inch records.

Figure 3:
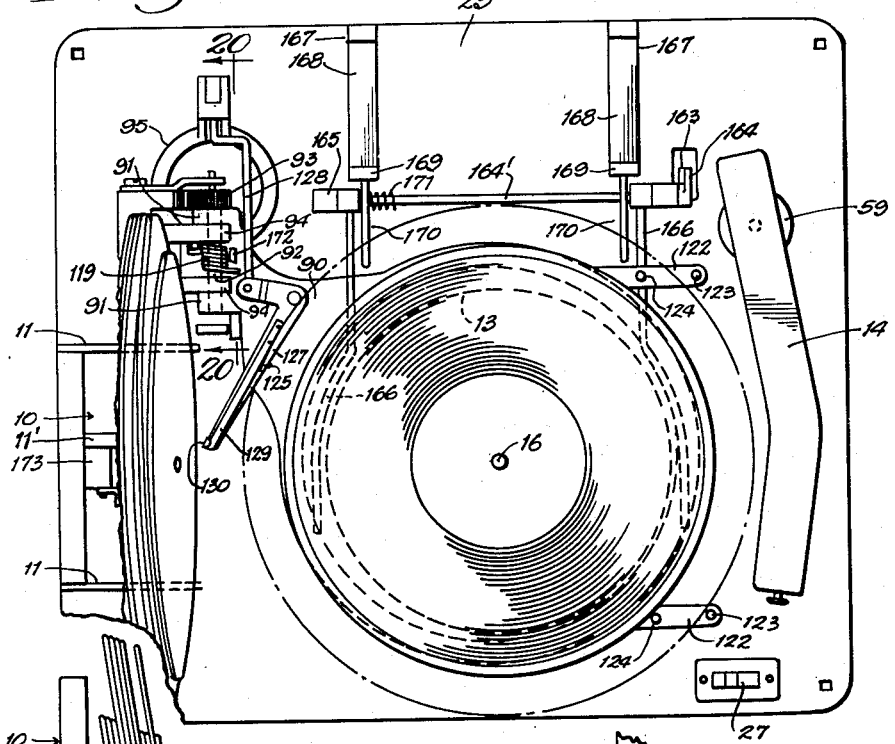
Figure 3 is a plan view of the phonograph with the transporting frame in the position it occupies during the playing of the first side of the record.
Figure 4:
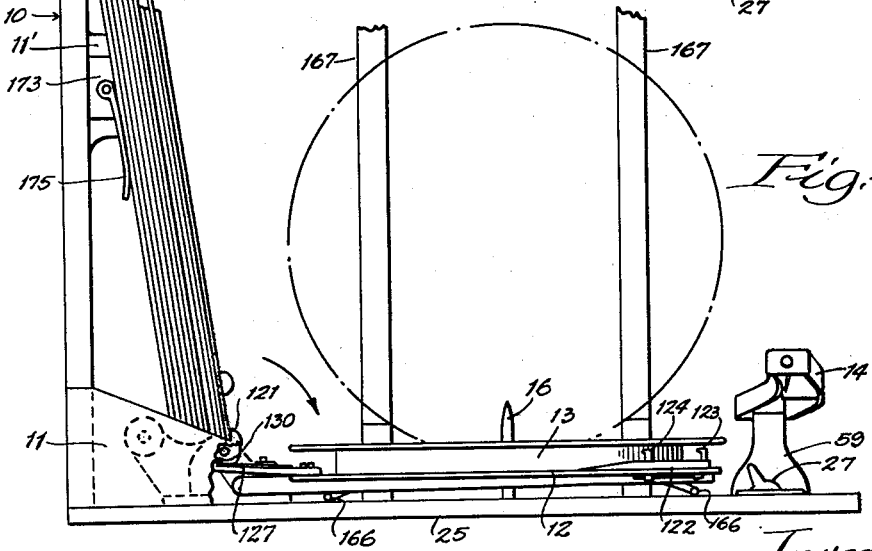
Figure 4 is a corresponding front elevation.

The innermost record is gripped by a transporting frame 12 in the position shown in Figures 1 and 2. This frame then pivots about a horizontal axis so as to place the record on the turntable 13. The frame 12 is arranged so as to release the record and then pass the turntable 13 into the position in which it is shown in Figures 3 and 4. When the record is thus placed and the player arm 14 moves inwardly to the initial playing position of the record on the turntable, the record is reproduced.

Figure 5:
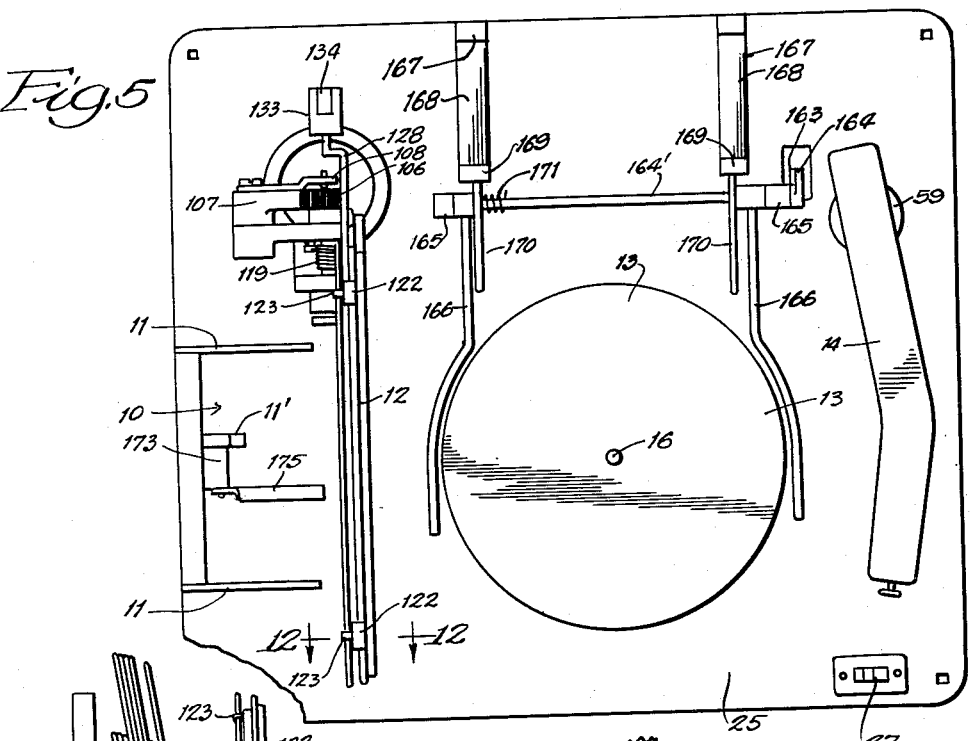
Figure 5 is a plan view of the phonograph with the transporting frame in the vertical position into which it moves after the playing of the first record.
Figure 6:
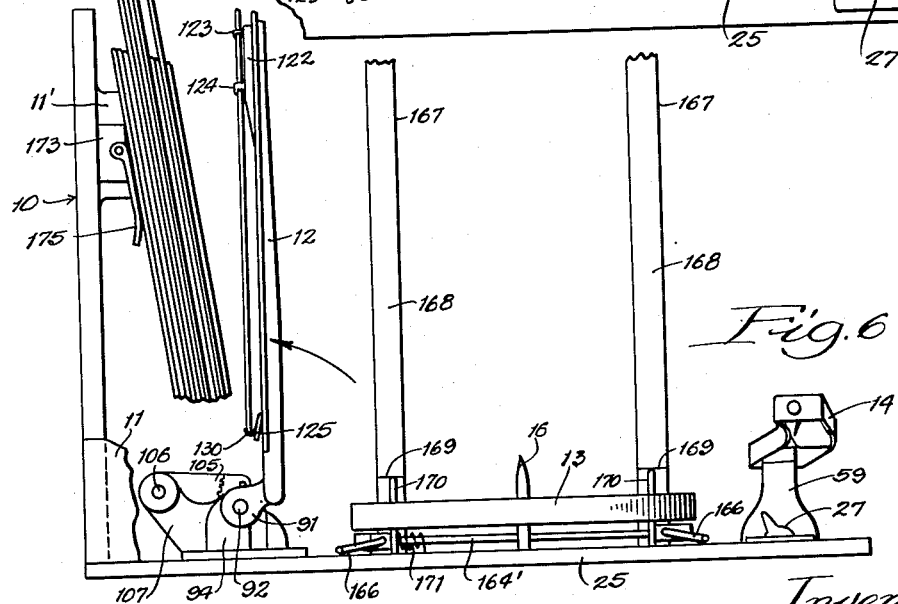
Figure 6 is a corresponding front elevational view.

At the end of the reproduction of the record, the position, or the retrograde movement, of the player arm 14 starts the record-changing mechanism, with the result that the frame 12 swings upwardly about its horizontal axis to a vertical or substantially vertical position as shown in Figures 5 and 6. The frame 12 then swings about an offset vertical axis located at position 15 on Figure 1 and consequently the record is moved from one side of the turntable to another side thereof, that is, the frame 12 is swung from its position in Figures 5 and 6 into its position shown in Figures 7 and 8.

The frame 12 now swings downwardly about its horizontal axis in the opposite direction, which presents the record to the turntable in reverse position, that is, with the unplayed side upwards. When the frame 12 approaches the turntable, as shown in dot-and-dash lines in Figure 10, its gripping means is released and the record is allowed to fall onto the table with its central opening passing over the turntable spindle 16. Thereupon the frame 12 swings upwardly about its horizontal axis into a position shown in full lines in Figures 9 and 10.

The player arm 14 moves inwardly into the initial playing position of the record and the record is reproduced. Consequently, both sides of the record are reproduced in sequence. At the end of the playing of the record, the record-changing mechanism again resumes operation, the player arm 14 is moved outwardly into the position shown in Figure 1, the frame 12 moves upwardly to a vertical or substantially vertical position and it is rotated about its vertical axis 15 towards the position shown in Figure 1.

The record on the turntable is then elevated by a discard frame 17 and discharged thereby into a discard magazine 18 as best shown in Figure 11. The discard frame 17 promptly moves down to a position below the turntable and it remains in this position until both sides of the next record have been reproduced.

It may here be noted that the frame 12 is provided with gripping means which enable a ten or twelve inch record to be picked up from the magazine 10 with the center opening in the same relation thereto. The gripping means comprises a movable gripping member and means are associated with this gripping member to insure the inward movement of the player arm 14 to correct initial playing position for a ten or twelve inch record.

It is of course to be understood that the invention is not intended to be limited to ten and twelve inch records. Such records are referred to only because they are the two sizes which are conventional at the present time. The machine may be equally well adapted for playing records of any definite size.

Having thus given a brief description of the general operation of the phonograph, I will now describe minutely the various elements and mechanisms which are used in this embodiment of the invention to attain the results above referred to.

The reference numeral 25 designates a motor board which may be supported in a cabinet in well known manner. On the under side of the motor board is mounted an electric motor 26 which is controlled by a switch 27. The motor drives a shaft 28 which projects upwardly through a suitable opening in the motor board. At its upper end the shaft 28 carries a friction roller 29 which operatively engages the inner side of the peripheral flange of the turntable 13.

The turntable is rigidly carried on the turntable spindle 16 which extends downwardly through an opening in the motor board 25. The lower end 31 of the spindle 16 is supported in a suitable bearing on a bracket 32 rigidly supported on the under side of the motor board 25.

The spindle 16 has rigidly mounted thereon a pinion 33 which meshes with an idler pinion 34. The idler pinion is rotatably mounted on a shaft 35 also carried by the bracket 32. The idler pinion 34 meshes with the pinion 36 which is freely rotatable on a spindle 37 also mounted on the bracket 32.

The pinion 36 is adapted to mesh with the peripheral teeth on a combined mutilated gear and cam wheel 38. The mutilated gear and cam wheel 38 is rotatably mounted on a shaft 39 which is supported on the bracket 32 and on the motor board 25 as best seen in Figure 17. A cam wheel 40 is also rotatably mounted on the shaft 39 below the combined mutilated gear and cam wheel 38.

The lower boss of the combined mutilated gear and cam wheel is provided with outwardly directed teeth to constitute a pinion 41. Upon the upper surface of the cam wheel 40 is an internal gear 42 which is twice the effective diameter of the pinion 41. The pinion 41 and the inner gear 42 are operatively connected by idler pinions 43 which are mounted upon a yoke member 44 which forms part of the bracket 32 (Figure 19).

It will thus be readily understood that when the combined mutilated gear and cam wheel 38 makes one revolution, the cam wheel 40 makes half a revolution.

The combined mutilated gear and cam wheel 38 is mutilated in that it lacks peripheral teeth at the position 45. When the gap 45 is adjacent the pinion 36 (as shown in Figures 15 and 16) the turntable and the pinions 33, 34 and 36 can rotate freely without driving the combined mutilated gear and cam wheel 38 or the cam wheel 40.

When the peripheral teeth of the gear 38 are brought into mesh with the pinion 36, the gear 38 will be given one revolution and the cam wheel 40 will be given half a revolution. At the end of one revolution of the wheel 38, the teeth gap 45 will again be adjacent the teeth 36 and the driving will be terminated until the wheel 38 is given an independent movement to bring its peripheral teeth into mesh with the pinion 36.

Below the teeth which engage the peripheral teeth of the wheel 38, the pinion 36 is provided with a small number of relatively large teeth 46 shown in the present embodiment of the invention as three in number. The teeth 46 are adapted to engage the outer extremity of a dog 47 which is pivotally mounted on the under side of the wheel 38 as best shown in Figure 17.

During the playing of a record, the dog 47 is held in its full line position, as shown in Figure 17, by means of a latch 48. This latch engages a portion 49 of the dog 47 which projects upwardly through a radial opening 50 in the wheel 38.

When the latch 48 is removed from latching position in a manner which will hereinafter be described, the dog 47 falls by gravity into the dotted-line position shown in Figure 17. In this position the outer end of the dog 47 is engaged by one of the large teeth 46 so that the wheel 38 is rotated to a slight extent, bringing its peripheral teeth into mesh with the cooperating teeth of the pinion 36.

As a result of this engagement, the wheel 36 is given one rotation and then it stops because, during this rotation, the dog 47 is elevated into its full line position, shown in Figure 17, and is held in this position by the latch member 48. It will be noted that in this full line position the dog 47 is out of the path of the teeth 46.

It may be noted that the wheel 38 is held in this inoperative position by means of a roller 51 which is carried on a lever 52. The lever 52 is biassed by a spring 53 so as to force the roller 51 into a recess 54 in a peripheral flange 55 of the wheel 38 above the peripheral teeth of this wheel.

The player arm 14 is connected by a horizontal pivot 56 to an arm 57 carried at the upper end of a sleeve 58. The arm 57 extends from the sleeve 58 away from the pickup. The sleeve 58 has a bearing in the vertical standard 59 rigidly mounted on the motor board 25. At its lower end the sleeve 58 has rigidly mounted thereon an arm 60. The boss of the arm 60 and the arm 57 hold the sleeve 58 against vertical movement.

A rod 61 extends through the sleeve 58, this rod being supported on a cam 62 on the upper surface of the wheel 38. It will readily be understood that when the cam 62 moves the rod 61 upwardly, the rod displaces the player arm 14 upwardly about its axis 56 so that the needle is elevated away from the record. When a record is being played, rod 61 rests on the lower dwell 63 of the cam 62 so that the player arm 14 is free to engage the record, as shown in Figure 17.

During the playing of a record, the gap 45 of the wheel 38 is opposite the pinion 36. When the wheel 38 is moved into mesh with the pinion 36, the wheel 38 is driven in the counterclockwise direction and a rise 64 on the cam 62 passes under the rod 61 so as to elevate the player arm 14 away from the record.

As the wheels 38 approaches the end of its rotation, a fall on the cam 62 passes under the rod 61 so that this rod moves downwardly into engagement with the low dwell 63 thus permitting the player arm 14 to move downwardly and bring its needle into engagement with the record.

The arm 60 being rigidly mounted on the sleeve 58, moves with the player arm 14 during its horizontal or translational movements, including the movement of the player arm resulting from the engagement of its needle with the record. The arm 60 carries a depending pin 66 which is adapted to engage a cam 67 formed on the upper surface of the cam wheel 38.

When a recording has been completely reproduced and the cam wheel 38 begins its single revolution, the pin 66 is in an inward position, for example the position shown in dash-and-dotted lines in Figure 18.

As the wheel 38 rotates in the counterclockwise direction as shown in Figure 18, a forward portion 68 of the cam 67 engages the pin 66 and swings the pin 66, the arm 60 and player arm 14 outwardly in counterclockwise direction until the player arm is located in an outward position clear of the turntable and clear of the largest record which may be on the turntable. It may be noted that before this outward movement begins, the player arm 14 has been elevated from the record by the action of the cam rise 64 of the cam 62 upon the rod 61.

The main portion of the cam 67 is circular in form so that the player arm is maintained in this clear position for the greater part of the rotation of the cam wheel 38. During this time, the record-changing movements of the frame 12 occur. After the record is placed upon the turntable and the rest of the mechanism is ready for its reproduction, the cam 67 clears the pin 66 and permits the inward movement of the player arm by means which will now be described.

Upon the under side of the motor board 25, and adjacent the arm 60, is pivotally mounted an arm 69 which is located at a lower level than the arm 60. Upon the upper surface of the arm 69 is mounted a slight spring 70 which projects through an abutment member 71. The abutment member 71 is a bent-up portion of the arm 69 as is shown in Figure 18. The arm 69 is biassed inwardly by means of a strong spring 72 which is connected to the arm 69 and to the under side of the motor board 25.

The pin 66 engages the spring 70 and abutment member 71 and consequently when the arm 60 is thrown outwardly to throw the player arm 14 clear of any record on the turntable, the pin 66 forces the arm 69 outwardly against the tension of the strong spring 72. When the arcuate portion 73 of the cam 67 moves past the pin 66, the spring 72 moves the arm 69 inwardly, keeping the pin 66 against portion 73 of the cam 67.

When the cam 67 clears the pin 66, this pin is engaged by the arcuate arm 74 of a lever 75 which is pivotally mounted on the upper surface of the wheel 38. The arcuate arm 74 conforms generally to the circular shape of the wheel 38. The lever 75 is biassed towards its position in Figure 18 by means of a weak spring 76 which normally positions the lever 75 against a stop 77.

The spring 72 being much stronger than the spring 76, the arm 69 forces the arm 60 and the pin 66 inwardly, the pin 66 deflecting the lever 75 in the clockwise direction from its position in Figure 18. The inward movement of the arm 69 under the action of the spring 72 continues until the arm 69 is arrested by its engagement with a stop 78. When this occurs, the pin 66 is in engagement with the arcuate arm 74 of the lever 75 and while it is thus engaged, the spring 76 forces the pin 66 against the spring 70 and against the abutment member 71 of the arm 69, the spring 76 being stronger or more effective than the very weak spring 70.

While the arcuate arm 74 still engages the pin 66, the fall 65 of the cam 62 passes under the rod 61 so that the player arm is caused to descend so as to bring the needle into engagement with the record, preferably a very short distance beyond the initial groove thereof. After this descent, the arcuate arm 74 moves past the pin 66 and thereupon the spring 70 becomes effective to push the pin 66, the arm 60 and the player arm 14 inwardly with a very slight force, thus bringing the needle into the initial groove of the record.

The arm 69 is provided with shoulders 79 and 80 adapted to engage the stop 78 to arrest the arm 69 and consequently the player arm 14 at appropriate positions for descent upon the outer edges of records of different sizes. Thus, in its full line position, shown in Figure 18, the stop 78 is adapted to engage the shoulder 79 to locate the player arm for playing of a ten-inch record. If the stop is in the dot-and-dash position shown in Figure 18, it will be engaged by the shoulder 80 so that the player arm is moved inwardly only into a position for descent of its needle upon the outer edge of a twelve-inch record. The means for controlling the position of the stop 78 will be hereinafter described.

The latch 48 is mounted by means of a pivot 81 on the wheel 38 as shown in Figure 18. The latch 48 is biassed towards latching position and towards an abutment member 82 by means of a spring 83. The end of the latch lever 48 remote from the dog 47 is bent substantially at right angles and carries a dog 84 which is adapted to cooperate with a serrated member 85 carried by the arm 60. The dog 84 is biassed into its position in Figure 18 by means of a spring 86.

It will readily be understood that as the arm 60 moves inwardly during the playing of a record, the serrated member 85 engages the dog 84. In the event that reverse movement is imparted to the player arm, for example by means of an eccentric end groove on the record, the dog 84 is swung in clockwise direction from its position in Figure 18, with the result that the latch 48 is likewise swung in clockwise direction and the dog 47 is released so that it drops into operative engagement with the teeth 46 to initiate one rotation of the wheel 38. The latched and unlatched positions of the dog 47 are shown in full and phantom lines on Fig. 17.

The arm 60 carries an adjustable abutment member 87 which is adapted to engage a downturned lip portion 88 on the latch member 48 adjacent the dog 84. When the player arm is moved into a predetermined position on the record, the abutment member 87 engages the abutment member 88 and the latch member 48 is swung in clockwise direction, releasing the dog 47 to initiate one revolution of the wheel 38.

On its under side, the arm 60 carries a depending flange 89 which is adapted to engage the upwardly projecting end of the dog 47 and move it radially inwardly so that it is again latched by the latch lever 48. This latching occurs when the wheel 38 has made half a revolution from its normal stationary position. Consequently, when the gap 45 of the wheel 38 again arrives opposite the pinion 36, the dog 47 is held out of contact with the large teeth 46 carried by this pinion.

The frame 12 is suitably in the form of a ring having an extension 90 (Figure 3) in the general plane of the ring. This extension is provided with a pair of apertured lugs 91 which receive a spindle 92. The spindle 92 is rigidly connected to the lugs 91. The axis of the spindle lies some distance to one side of the annular part of the frame 12 as best seen in Figure 3. As also best seen in this figure, a line at right angles to the axis located approximately between the two lugs 91 is substantially tangential to the annular part of the frame.

At one end, the spindle 92 carries a pinion 93 which is likewise rigidly secured to the spindle 92. The spindle 92 is rotatably supported by means of lugs 94 which are integrally mounted on a collar 95. This collar, best seen in Figure 20, is rotatably mounted on the motor board 25 by means of a boss 96 rigidly mounted on the motor board. The collar 95 is provided with a shoulder which rests upon the upper end of the boss 96. The collar 95 is held against upward displacement by means of a ring 97 secured to its lower end, the ring overlapping the under side of the boss 96.

It will thus be seen that the collar 95 is mounted for rotation about a vertical axis. The spindle 92 is located in a horizontal position. When the frame is in the positions shown in Figures 1, 2, 3, 4, 5 and 6, the spindle 92 is parallel to the general planes of the records in the magazine 10. When, however, the frame 12 is in its position shown in Figures 7, 8, 9 and 10, the spindle 92 is parallel to the general planes of the records in the discard magazine 18.

The collar 95 is swung about its vertical axis to locate the spindle 92 in these two positions by means of a bar 98 which is pivotally connected by means of a pin 99 to the under side of the collar 95. The bar 98 is pivotally connected to a bar 100 which is pivotally connected by a pin 101 to the under side of the motor board 25. The bar 100, at an intermediate position, carries a roller 102 which is arranged to cooperate with an outside cam 103 and an inside cam 104 formed on the upper surface of the cam wheel 40.

When the frame 12 is in the position shown in Figures 3 and 4, that is, in the position for the playing of the first side of a record, the cams 103 and 104 have the relation to the cam roller 102 shown in Figure 19. During the playing of this side of the record, the cam wheel 40 is stationary. After this record is played, the cam 40 is rotated half a revolution in the clockwise direction so that the outer cam 103 engages the roller 102 and forces it inwardly, swinging the bar 100 in the clockwise direction, as viewed from below about its pivot 101.

Consequently, the collar 95 is thrown through an arc of approximately ninety degrees in the clockwise direction, as viewed from below, and in counterclockwise direction as viewed from above. This movement of the collar 95 moves the frame 12 from its position in Figures 5 and 6 into its position in Figures 7 and 8.

After the second side of the record has been played, the cam wheel 40 is rotated through another half revolution and the inner cam 104 throws the roller 102 outwardly, swinging the bars 100 and 98 into the position in which they are shown in Figure 15. The resultant movement of the collar 95 returns the frame 12 from its position in Figures 9 and 10 back to its position in Figures 5 and 6.

The manner in which the frame 12 is swung around the spindle 92 between a substantially horizontal position on one side of the spindle 92 and a substantially horizontal position on the other side of said spindle, will now be described. The pinion 93 meshes with a sector 105 which is pivotally mounted by means of a pivot 106 on an extension 107 on the lug 94 which is adjacent the axis of the collar 95. The sector 105 rigidly carries an arm 108 to which is pivotally connected the upper end of the rod 109, this upper end being bent outwardly at right angles with relation to the main length of the rod.

The rod 109 normally lies substantially in the axis of the collar 95. At its lower end, it has pivotally mounted thereon a clevis 110 which in turn is pivotally mounted to the upper end of a bell crank lever 111. The bell crank lever is pivotally mounted on a bracket 112 on the under side of the motor board 25. The lower or downwardly directed arm of the bell crank lever 111 is pivotally connected to one end of a bar 113.

The other end of the bar 113 is pivotally connected to one end of a bar 114, the other end of which is pivotally connected by means of pin 115 to the under side of the motor board 25. Adjacent its point of pivotal connection with the bar 113, the bar 114 carries a roller 116 which is located within a cam track 117 provided on the under surface of the cam wheel 40.

It will readily be understood that as the cam wheel 40 rotates, the bar 113 is moved longitudinally in one direction and the other in accordance with the shape of the cam track 117, and the result of the longitudinal movements of the bar 113 is to swing bell crank lever 111 and to swing the frame 12 about the axis of the spindle 92 into the various positions of the frame 12 shown in the drawings.

During the playing of the first record, the frame 12 is in the position shown in Figures 3 and 4, being located in this position by the roller 116 which is then in the position in which it is shown in Figure 15. At the end of the playing of the first side of the record, the cam wheel 40 makes half a rotation in the counterclockwise direction as viewed in Figures 15 and 16. During the first part of this rotation, the cam track 117 is substantially arcuate and consequently the roller 116 does not move outwardly until the rise 68 on the cam 67 has swung the player arm outwardly to its extreme position. Thereafter the roller 116 is moved out gradually until the frame 12 reaches a substantially vertical position, which position is attained after the cam wheel 40 has made approximately one quarter of a revolution from its position in Figure 15.

Shortly thereafter the roller 102 is engaged by the outer cam 103 and swung inwardly so that the frame 12 is swung around from its position in Figures 5 and 6 into its position in Figures 7 and 8. During this movement of the frame about the axis 15, the cam wheel 116 is moved further outwardly so that the frame descends through the position in which this frame is shown in Figure 9. After the swinging movement of the frame about the axis 15 is terminated, the frame 12 moves further downwardly towards the turntable into the position in which it is shown in dot-and-dash lines in Figure 10.

During the continued half rotation, the roller 116 is moved inwardly to a certain extent into the position in which it is shown in Figure 16. This has the effect of reversing the movement of the frame about the axis of the pin 92 so that this frame is elevated at an angle as shown in Figures 9 and 10, sufficient to permit the player arm 14 to move inwardly and play the record. When this condition is attained, the drive of the wheel 38 is terminated, this wheel having made a complete revolution.

Owing to the gear connection between the wheel 38 and the wheel 40, the latter makes only half a revolution and it is now in position in which it is shown in Figure 16. When the upper side of the record now on the turntable is played, the player arm 14 initiates the drive of the wheel 38 so that it makes a complete revolution and the player arm is actuated in the manner previously described by the complete rotation of the wheel 38. During that complete rotation, the cam wheel 40 makes half a revolution in the counterclockwise direction, as viewed in Figures 15 and 16 from its position in Figure 16 into its position in Figure 15.

During the initial part of such half revolution, the cam roller 116 is moved progressively outwardly, thus bringing the frame 12 into a vertical position. When it attains that position, the cam roller 116 is located opposite an enlargement or recess 118 in the cam track 117.

The roller 116 is biased into the recess 118 by means of a coil spring 119 on the spindle 92. One end of this spring engages the under side of the frame 12. The other end is hooked so as to engage a screw 120 carried on one of the lugs 94 on the collar 95. The spring is arranged so that it tends to move the frame 12 away from the vertical into engagement with the stack of records about to be played in the manner shown in Figure 1. The spring 119 forces the frame 12 into engagement with the outermost record of those which are to be played. It will thus be seen that the frame 12 moves into engagement with any record on the magazine 10 which remains to be played, but since it is moved in resiliently, the frame may accommodate itself to the outermost record when the magazine is full, and likewise it may accommodate itself to the other records up to the very last one.

As best seen in Figure 2, the supports 11 have their upper surfaces sloped downwardly in the inward direction. At their innermost ends they are provided with upwardly directed abutment members 121 which engage the outermost record. It will readily be seen that when the outermost record is removed, the other records slide down the inclined upper surfaces of the supports 11 and the new outermost record engages the abutments 121.

The ring portion of the frame 12 is provided with two outwardly directed extensions 122, that is, they are directed outwardly, away from the axis defined by the spindle 92. The general location of these extensions is best seen in Figure 11. Each of these extensions 122 carries a pair of gripping members 123 and 124 located at the proper positions to locate a twelve-inch record or a ten-inch record with their centers at substantially the same position on the frame.

In Figure 13 a twelve-inch record is shown being engaged by an outer gripping member 123 while in Figure 12 a ten-inch record is shown being engaged by an inner gripping member 124. The gripping members 123 and 124 are provided with inwardly directed recesses which serve to engage a gripped record and to prevent the same falling off the frame until a gripper 125 is released. The gripping members 123 and 124 do not actually grip the record. They merely cooperate with the movable gripper 125 to serve as gripping means to hold the record.

The outer gripping members 123 are rigidly mounted in the extensions 122. The inner gripping members 124 are mounted for axial movement in the extensions 122. They are biassed towards the record gripping side of the frame 12 by means of springs 126. It may here be noted that when the frame 12 is presented to a ten-inch record in the outermost position on the magazine 10, the gripping members 124 on the extensions 122 occupy a position slightly above the edge of the ten-inch record.

When the gripping latch 125 is actuated in the manner hereinafter to be described, the outermost record is moved upwardly slightly so that the record enters the recess in the lower gripping members 124 on the two extensions 122.

However, when the frame 12 is presented to the magazine and the outermost record is a twelve-inch record, then the gripping members 123 occupy a position slightly above the outermost record, but the outer ends of the gripping members 124 engage the surface of the large outermost record and these gripping members are moved inwardly into the inoperative position shown in Figure 13.

It will be noted that when the gripping latch 125 moves the outermost record upward so as to cause its upper marginal portions to enter the recesses of the gripping members 123 or 124, as shown in Figures 13 and 12, respectively, the lower marginal portions of the elevated record are raised clear of the abutment members 121 on the supports 11 so that the record is released for movement with the frame 12 away from the magazine.

The gripping latch 125 is best seen in Figures 14 and 3. This movable gripping member comprises a bell crank lever 127 which is pivotally mounted on the extension portion 90 of the frame 12 as is best shown in Figure 3. The short end of the bell crank lever is connected to a rod 128. The long end of the bell crank lever 127 carries an elongated resilient member 129 which suitably may be made of spring stock. One end of the resilient member 129 is rigidly secured to the long arm of the bell crank lever adjacent its pivot. The remote end of the resilient member 129 is provided with an upturned lip 130 which is adapted to engage a record on the frame 12. This lip 130 is located so that it engages the record at its point which is lowest when the frame 12 is vertical.

Adjacent the lip 130 the resilient member 129 is provided with a pin 131 which is free to move in an opening in the long arm of the bell crank lever 127. It will be noted that the pin 131 is mounted on the resilient member 129 and is directed away from the resilient member 129 in a direction opposite to the position of the lip 130.

The bell crank lever 127 may be provided with a supporting lug 132 which is directed towards the frame 12 and is adapted to engage the extension 90 and serve as an abutment for the bell crank lever 127 when the resilient member 129 is engaging the outermost record in the magazine. In its normal unlatched position, the resilient member 129 is located so that it will engage the outer surface of the outer most record on the magazine 10, whether it be a ten-inch record or a twelve-inch record, with the record-engaging lip slightly below the lowermost edge of the outermost record.

As the frame 12 moves to a greater or less degree into engagement with the outermost record, the resilient member 129 is forced towards the frame 12 to a greater or less degree. It will be readily understood that when the gripper latch 125 is thereafter moved upwardly, the outermost record will be gripped by the lip 130, the outermost record will be lifted clear of the abutment 121, and the outermost record will be firmly gripped on the frame 12 by the gripper 125, by one or the other pairs of the gripping members 124 or 123, depending upon whether the record grip is a ten or twelve inch record.

The rod 128 is provided with an offset end which is located in substantial alignment with the spindle 92 as best seen in Figure 20. This offset end has a swivel connection to the bifurcated yoke 133 which is connected by a horizontal pivot to a lever 134 pivotally mounted by a horizontal axis upon a lug 135 carried by the collar 95 (Figure 20). The lever 134 rigidly carries an arm 136 which has a ball-and-socket connection to a vertical rod 137.

At its lower end, the rod 137 is connected by a ball-and-socket joint to the horizontal arm of a bell crank lever 138 pivotally mounted on the bracket 112 on the under side of the motor board 25. The depending arm of the bell crank lever 138 is connected to a bar 139 which is pivotally connected to a bar 140 adjacent one of its ends. The other end of the bar 140 is pivotally supported from the motor board by a pivot 141.

Adjacent its point of connection to the bar 139, the bar 140 carries a cam roller 142 which cooperates with an outside cam 143. The bar 139 is biassed by a spring 144 so as to force the roller 142 towards the cam 143. The spring 144 tends to move the rod 137 downwardly and tends to move the gripper 125 towards record gripping position.

During the playing of the first side of a record, the roller 142 is held inwardly towards the center of the cam wheel 40 by a dwell 145 on the cam 143 and the record gripper is in release position. After the cam wheel 40 is moved to a certain extent, the roller 142 moves into an enlargement 146 in the cam 143 and consequently the spring 144 is free to move the bar 139 to effect gripping of the record.

After the cam 40 is rotated less than a half revolution, the roller 142 is engaged by a cam rise 147 on the cam 143 and the gripper is released for the playing of the other side of the record. During the playing of the other side of the record, the roller 142 engages the cam dwell 148, holding the gripper unlatched during the playing of the second side of the record.

After the playing of the second side of the record, the gripper remains unlatched while the cam wheel 40 moves through a considerable angle. The roller 142 then enters an enlargement 149 in cam 143 and the spring 144 is again free to close the gripper. The gripper remains in gripped condition, holding a new record on the frame 12 until the cam wheel 40 has rotated about 142 degrees, whereupon the roller 142 engages a cam rise 150 and the gripper is again released for the playing of the first side of the next record during which time the roller 142 is in the position shown in Figure 15.

The bar 140 carries an extension 151 which is adapted to engage a downwardly directed pin 152 carried by bell crank lever 153 pivotally mounted on the under side of the motor board. A long arm of the bell crank lever 153 is pivotally connected to a bar 154 which is slidably mounted on the under side of the motor board 25 by means of screws and slots. One end of the bar 154 carries the abutment 78 previously referred to and which is best shown in Figure 18.

The cam wheel 40 carries a peripheral projection 155 which is adapted to engage an arm 156 rigidly mounted on the boss of the bell crank lever 153. The arm 156 slopes to the left away from the radial direction as viewed in Figure 15. Consequently, when the projection 155 engages the arm 156, the bell crank lever is swung in the counterclockwise direction as viewed in that figure and the bar 154 is actuated so as to locate the projection 78 in the twelve-inch position.

It will readily be understood that when the gripper 125 moves to gripping position, it moves to a greater extent for a ten-inch record than it does for a twelve-inch record. When a twelve-inch record is engaged, the arm 151 moves into engagement with the pin 152. When, however, the gripper engages a ten-inch record, then the roller 142 moves to a greater extent into the enlargement 146 or 149 of the cam 143 and consequently the arm 151 swings the bell crank lever 153 so as to move the bar 154 from its set position into the full line position in Figure 18 for the playing of a ten-inch record.

The projection 155 is located so that it engages and actuates the arm 156 just before the gripper 125 engages a record on the magazine 10. Thus, as shown in Figure 16 in which the cam wheel 40 moves in counterclockwise direction, the projection 155 is adapted to engage and swing the arm 156 in the counterclockwise direction just before the roller 142 moves into the enlargement 149 in the cam 143.

Only one projection 155 is necessary and this is arranged to actuate the arm 156 before the first side of the record is played, and indeed before the record is gripped on the magazine 10 preparatory to its being placed on the turntable for the playing of its first side. As best shown in Figure 17, the projection 155 is located on the upper part of the cam wheel 40. The pin 152 projects downwardly to engage the projection 155 but terminates so that it does not engage the lower part of the cam wheel 40.

The lower part of the cam wheel 40 carries a peripheral cam projection 157, the lower surface of which is both arcuate and beveled as best seen in Figures 15 and 17. This lower surface is adapted to engage a roller 158 carried on an arm 159 which is rigidly mounted on a shaft 160. The shaft 160 is horizontal and is rotatably supported on bearings 161 carried on the under side of the motor board 25.

The shaft 160 also rigidly carries an arm 162 which is connected by a link 163 to an arm 164 which is rigidly mounted on one end of the shaft 164' of the discard frame 17. The shaft 164' is rotatably mounted on bearings 165 mounted on the upper side of the motor board 25, the discard frame 17 comprising two arms 166 which are rigidly mounted on the shaft 164'.

The outer ends of the arms 166 are conformed as best seen in Figure 5, so that they normally lie clear of the turntable 13 and in close propinquity thereto. The turntable is of smaller diameter than the records of smallest diameter intended to be played automatically. Consequently, when the discard frame 17 swings upwardly, these records are elevated from the turntable and are deposited by the frame 17 into the discard magazine 18 as best shown in Figure 11.

The discard frame comprises two vertical frame members 167 which are provided with major supporting surfaces 168 sloping slightly outwardly from the vertical. Adjacent their lower ends the frame members 167 are provided with supporting surfaces 169 which slope downwardly slightly with respect to the horizontal, as best seen in Figure 11, so that discarded records tend to slide downwardly into engagement with the almost vertical surfaces 168.

The lower ends of the frame members 167 are provided with guides 170 which extend in continuation of the surfaces 169 into close proximity to the turntable. It will readily be understood that when the frame 17 rises, a record is elevated from the turntable and its lower edge rests against the two guides 170. As the frame 17 moves upwardly, the record rides along the guides 170 and when the frame 17 reaches an outward position slightly beyond vertical, as shown in Figure 11, the record drops into the discard magazine 18.

It will readily be understood that when both sides of a record have been played, the projection 157 on the cam wheel 40 actuates the roller 158 so that the frame 17 is swung into the position in which it is shown in Figure 11. The frame 17 is returned to initial position immediately by means of a spring 171 which may be mounted on the shaft 164'.

The operation will be best understood with more particular reference to Figure 22 which is a diagrammatic showing of the cam structures of the invention. The showing of these cams is expanded relation corresponds to one complete rotation of the cam wheel 40 and two complete rotations of the cam wheel 38. The position at the left-hand side of the diagram of Figure 22 corresponds to the playing of the first record. The latch 125 is unlatched, the frame 12 is horizontal, being in the position in which it is shown in Figures 3 and 4. The frame 12 is in its first position, that being the position in which the axis of the spindle 92 is parallel to the records in the magazine 10. The player arm is down and it is free to move over the record.

When the first side of the record has been played and the record-changing mechanism has been tripped, the cam wheel 38 starts rotation and the pin 61 immediately rises as a result of its lower end climbing up the cam surface 64. This raises the player arm off the played record. Shortly thereafter the pin 66 is engaged by the cam rise 68 and the player arm is swung out to its extreme position, being held out by the cam 67 during the greater part of the rotation of the cam wheel 38.

When the player arm has been swung out completely, the frame 12 starts to rise to vertical position as a result of the cooperation of the wheel 116 with the cam track 117. During the initial part of this rise, the latch 125 is engaged so that the record lifted off the turntable by the rising frame 12 after the playing of its first side, is again latched on the frame 12. The latching is of course effected by the roller 142 cooperating with the cam 143.

After the record has been latched to the frame 12 and the frame has risen to its vertical position, the cam 103 swings the roller 102 inwardly, thus swinging the frame 12 as a whole about the vertical axis 15 into its second position, that is, the position in which the axis of the spindle 92 is parallel to the records in the discard magazine 18. During the latter part of the swinging movement of the frame 12, this frame is swung about the axis of the spindle 92 by cooperation of the roller 116 and the cam track 117. At the end of the swinging movement about the vertical axis 15, the frame 12 will have moved down into its dot-and-dash position in Figure 10.

It is to be noted that in moving down to this position, the center hole of the record is engaged by the turntable spindle 16. This spindle moves the engaged record to the right, as viewed in Figure 10, relative to the frame 12. This relative movement is in part due to the arcuate movement of the frame 12 about its spindle 92. This movement is sufficient to withdraw the engaged marginal portions of the record out of the recesses in the gripping members 123 and 124. This slight movement of the record upon the frame 12 is permitted by the resilient mounting of the gripper latch 125 which is biased towards gripping position by the spring 144.

The gripper latch 125 is now released so that the record drops onto the turntable preparatory to playing the second side thereof. Immediately thereafter the cam track 117 begins to raise the frame 12 towards vertical position. At the same time the player arm begins to move in as a result of the engagement of the pin 66 with the inturning end of the cam 67. The player arm is arrested at initial playing position by engagement of the appropriate one of its shoulders 79 or 80 with the stop 78. It is to be noted that the stop 78 has not been moved during the operation just described. As will hereinafter appear, the stop 78 was properly conditioned for playing the first side of the record and it remains in the same condition for the proper playing of the second side of the record.

The inward movement of the player arm to initial playing position is accomplished just before the cam wheel 40 has made half a revolution and just before the cam wheel 38 has made a complete revolution. In the last few degrees of the rotation of the cam wheel 38, the rod 61 rides down the cam fall 65 and the needle is engaged with the record. After this engagement, the pin 66 clears the arcuate arm 74 and consequently the weak spring 70 becomes effective gently to push the player arm inwardly so that the needle engages the first groove of the record. Thereupon the cam wheels 38 and 40 stop in the manner previously described. The machine is now in the condition shown in Figure 9 and in full lines in Figure 10.

At the end of the playing of the second side, the player arm trips the mechanism and the various cams perform the operations diagrammatically illustrated at the right-hand half of Figure 22. In the first few degrees of the rotation of the cam wheel 38, the player arm is raised and thereafter it is swung out in precisely the same manner as described in the first half cycle which occurred after the playing of the first side of the record.

Immediately the cam wheels 38 and 40 start to rotate, the frame 12 is moved towards the vertical and at the same time it is swung about its vertical axis 15 towards its first position. As will readily be seen from Figure 22, the player arm is thrown out to its extreme position before the swinging movement of the frame 12 about its vertical axis 15 has been completed. Likewise, the frame 12 has reached its vertical position before the completion of the swinging movement about the vertical axis 15.

After the swinging movement is completed, the cam 157 throws the discard frame 17 into its position in Figure 17, thus elevating the record of which both sides have been played from the turntable and moving it into the discard magazine 18. At about this time the cam 155 engages the arm 156 and resets the stop 78 to the twelve-inch position.

Immediately thereafter the cam roller 116 moves into the enlarged portion 118 of the cam track 117 so that the frame 12 is resiliently moved beyond the vertical position by the spring 119 into engagement with the outermost record in the magazine 10. Immediately thereafter the gripper latch 125 moves to gripping position so that the outermost record in the magazine is now gripped upon the frame 12.

It may here be noted that if a twelve-inch record is gripped, then the gripper member 125 moves to a comparatively small extent and the roller 142 enters to a limited extent only into the recess 149 on the cam 143. Consequently, the throw of the arm 151 is limited and it does not actuate the pin 152 or the bar 154. Thus, the stop 78 remains at the twelve-inch position. However, if a ten-inch record is gripped, the movement of the roller 142 is greater and the arm 151 engages the pin 152 and the bar 154 is moved away from its pre-set position into the full line position in Figure 18, that is, the ten-inch record position. In either case the stop 78 remains in the position in which it is now set until after both sides of the record have been played, as has previously been described.

Thereafter the frame 12 is swung outwardly towards the turntable 13 about its spindle 92. After the center hole of the record has been engaged upon the spindle 16, the gripper latch 125 opens. The side of the record supported by this latch falls downwardly and the obliquity of the falling record clears the record from the recesses of the gripping members 123 and 124. It may be noted, however, that these gripping members are moving in an arc, whereas the turntable spindle is vertical and in the relation of a chord to that arc, so that the tendency of the record to follow the turntable spindle also serves to clear the record from the gripping members 123 or 124, as the case may be. Furthermore, the upper end of the turntable spindle 16 is of conical shape so that it likewise tends to move the record away from the recesses of the gripping members 123 and 124.

The released record falls upon the turntable and the frame 12 continues to move until it reaches the horizontal position in which it is shown in Figure 4. Thereafter the elevated player arm is moved inwardly into initial playing position which is determined by the position of the stop 78, the player arm moves downwardly to bring the needle into engagement with the periphery of the record, and, finally, the pin 66 clears the curved arm 74 and the spring 70 biasses the player arm gently inward until the needle enters the first groove of the record.

The spring 119 has been previously described. This spring is arranged to bias the frame 12 in the counterclockwise direction as viewed in Figure 2 into engagement with the records in the magazine 10. This spring is tensioned when the frame 12 swings downwardly about the spindle 92 from the position shown in Figure 2 into the position shown in Figure 4. Consequently, when the frame 12 begins to rise from the position in Figure 4, the tension spring aids the motor in elevating the frame.

When, however, the frame 12 swings upwardly from its dot-and-dash line in Figure 10 into its full line position in that figure, and still further into its vertical position, it carries no record and consequently the power of the motor may be employed to tension the spring. It is preferred that the spring should be inoperative when the frame 12 is in its horizontal position shown in dot-and-dash lines in Figure 10, and in similar lines in Figure 21. For this purpose, the hooked end of the spring 119 is free from the screw 120 and this end is adapted to be engaged by a projection 172 on the record-engaging side of the frame 12.

It will readily be seen in Figure 21 that when the frame is in the horizontal position shown in dot-and-dash lines in this figure and in Figure 10, the spring 119 abuts exclusively against rigid portions of the frame 12 so that it is ineffective. When the frame 12 starts to move upwardly from this dot-and-dash position, the hooked end of the spring 119 engages the screw 120 and thereafter the spring is tensioned by the motor.

It will be understood that the motor 26 may be started and stopped at will by the switch 27. It is, however, preferred to provide switch means whereby the machine will stop at a suitable part of its cycle. Thus I may provide in the motor circuit two switches 173 and 174 located in parallel as shown in Figure 23. The switches 173 and 174 may be located in the same line as that which includes the switch 27 or they may be included in the other line.

The switch 173 is suitably mounted adjacent the support 11' as shown in Figure 2. This switch comprises a long arm 175 which is normally biassed to switch open position and into the position occupied by records to be placed in the magazine 10. When one or more records are in the magazine, the arm 175 is pushed rearwardly, closing the switch 173. It will thus be readily understood that when the last record is removed from the magazine 10, the switch 173 opens.

The switch 174 is normally closed and is adapted to be opened by any moving part of the record-changing mechanism so as to be opened at any desired point of the cycle. Thus, the switch 174 may be arranged to be opened once during each complete revolution of the cam wheel 40 by any suitable cam means thereon.

In the embodiment of the invention shown, I have arranged the switch 174 to be opened after the second side of the record has been played and preferably after the discard frame 17 has moved to its upward position to discard a record and just before the frame 12 moves inwardly from the vertical towards the magazine 10. This may suitably be done by arranging the switch 174 adjacent the roller 158. The switch 174 is normally closed. When, however, the roller 158 is swung outwardly by the cam 157, the roller 158 engages a piece of insulation 176 on one contact of the switch 174 so that the switch is opened.

To start the operation of the machine, the manual switch 27 should be opened and a suitable number of records should be placed in the magazine 10. The switch 174 was left open but the placing of the records in the magazine 10 closes the switch 173. Then the manual switch 27 is closed and the motor circuit is completed.

When the last record is latched onto the frame 12 and removed from the magazine 10, the switch 174 is closed since this latching occurs after the actuation of the discard frame 17. Consequently, the opening of the switch 173 does not interrupt the operation of the motor. The motor proceeds to drive the phonograph until both sides of the last record are played, the switch 173 being opened and the switch 174 being closed during such playing.

After the playing of the second side of the record, the discard frame 17 is elevated into discarding position and the switch 174 is then opened, thus terminating the drive of the motor. The motor thus stops just before the roller 116 enters the enlargement 118 of the cam track 117 and consequently the motor stops before the frame 12 moves in towards the magazine 10. Consequently the magazine 10 is unobstructed by the frame 12 and the stack of records to be played may be easily slipped into the magazine.

It will thus be seen that I have provided a simple record changer in which the records are taken one after the other from a stack in the magazine, each record being played first on one side and then on the other side, the fully-played record being deposited in a discard magazine.

My improved phonograph can very readily be operated, since it requires no skill to place a mixed stack of records in one magazine or to take such a stack from the other magazine.

My improved phonograph is fully automatic, of very simple construction, and can be operated for long periods of time without attention.

It will be understood that various modifications and changes may be made in my phonograph without departure from my invention. Thus, in the embodiment illustrated, I have shown two separate cams, one of which makes a half revolution while the other makes a full revolution. The latter cam is intended for functions which may be identical at both parts of the complete cycle, for example, the player arm manipulation which may be identical for the playing of both sides of a record. It will of course be understood that I may effect all the record changing movements from a single cam and that many other changes may be made in the phonograph described and illustrated without departing from the scope of my invention.

Having thus described my invention, what I claim as new and desire to secure by Letters Patent of the United States, is:

1. In an automatic phonograph, in combination, a turntable, a record-carrying frame, means pivotally supporting said frame for moving the same in opposite directions into a position substantially parallel with the turntable, means for moving said supporting means across the turntable to locate said frame on one side of the turntable and on another side of the turntable, and vice-versa, and means for swinging said frame towards the turntable when said frame is located on one side of the turntable and for swinging the frame in the opposite direction towards the turntable when the frame is on the other side of said turntable.

2. In an automatic phonograph, in combination, a turntable, a member pivotally mounted on an axis generally parallel to the axis of the turntable and adjacent said turntable, a record-carrying frame mounted on said member for movement into substantially vertical position and into horizontal positions on each side of said vertical position, means for moving said member to bring said frame to positions to one side of said turntable and to another side of said turntable, means for moving said frame relative to said member to bring said frame into substantially horizontal position and into cooperative relation with said turntable, gripping means on said frame, means for actuating said gripping means to release and to grip a record, and means independent of said frame for removing a record from the turntable.

3. In an automatic phonograph, in combination, a turntable, a magazine adapted to receive a stack of records located to one side of said turntable, a magazine adapted to receive played records and located to another side of said turntable, a swinging frame adapted to receive a record from first said magazine and to place the record on the turntable with one side up, means for moving said frame into another position, means for actuating said frame to place the record on the turntable with the other side up, and a second swinging frame adapted to remove the played record from the turntable and to convey it to second said magazine.

4. In an automatic phonograph, in combination, a turntable, a magazine adapted to receive a stack of records located to one side of said turntable, a magazine adapted to receive played records and located to another side of said turntable, a swinging frame adapted to receive a record from first said magazine and conformed to enable it to be located around the turntable, means for swinging said frame into a position around the turntable, whereby said record is placed on the turntable for playing, means for swinging said frame upwardly to remove the record from the turntable, means for swinging said frame across the turntable, means for swinging said frame downwardly in the opposite direction to drop the record in inverted condition onto the turntable, and record-removing means adapted to remove the record from the turntable and to convey it to second said magazine.

5. In an automatic phonograph, in combination, a generally horizontal turntable, a magazine located to one side of said turntable and adapted to receive a stack of records to be played thereon, a frame adapted to receive a record from said magazine, means for swinging said frame about a horizontal axis towards the turntable to place said record thereon, means for raising said frame upwardly about said axis to remove the record from the turntable, means for swinging said frame about a vertical axis across the turntable, means for swinging said frame downwardly in the opposite direction to supply said record to the turntable in inverted condition, a magazine adapted to receive played records from said turntable, a swinging frame adapted to be swung to remove a played record from said turntable, and means for actuating last said frame to effect said removal and to transfer the played record to last said magazine.

6. In an automatic phonograph, in combination, a generally horizontal turntable, a magazine to one side of said turntable adapted to support a stack of records in substantially vertical position, a discharge magazine on another side of said turntable for receiving played records, a swinging frame pivotally mounted adjacent second said magazine and having a normal position below and around said turntable, whereby the frame may be swung upwardly to remove a record from the turntable and transfer it to second said magazine, a record-carrying frame, a member pivotally mounted on an axis adjacent and substantially parallel to the axis of the turntable, second said frame being pivotally mounted on said member to swing thereon into substantially vertical position and into substantially horizontal positions on each side of said vertical position, gripping means on second said frame, a player arm adapted to cooperate with the upper side of said records when placed on the turntable, and automatic means adapted to be put into operation by said player arm at the end of the playing of a recording for actuating the aforesaid means in two different record-changing cycles to effect the playing of both sides of a record, one cycle comprising the movement of the player arm clear of a record on the turntable, the movement of second said frame into contact with a record in first said magazine, the removal of a record from the turntable by first said frame into second said magazine, the gripping of a record on first said magazine, the swinging of the second said frame downwardly around and below the turntable, the release of the gripping means to permit the record to be received on the turntable, the inward movement of the player arm into cooperative relation with the upper side of the record on the turntable, the next record-changing cycle comprising the upward movement of second said frame about its horizontal axis, the gripping of the record removed from the turntable upon said frame, the swinging of said frame across the turntable, the downward movement of second said frame in the opposite direction about its horizontal axis into a position above the turntable, the release of the gripping means to permit the record to move onto the turntable with its unplayed side uppermost, the elevation of second said frame away from the record, and the inward movement of the player arm into cooperative relation with the uppermost side of the record.

7. In an automatic phonograph, in combination, a generally horizontal turntable, a magazine adapted to support a stack of records in substantially vertical position, said magazine including supports for the records which slope downwardly towards the turntable and abutment means for holding the lower end of the outermost record at a definite position on said supports, whereby the lower end of said stack is adapted to slide downwardly towards the turntable along said supports to bring the outermost record into engagement with said abutment means, a record gripping frame arranged to grip a record in the record position defined by said abutment means, means for moving said frame between last said position and a position adjacent the turntable to effect transfer of the outermost record from the magazine to the said turntable.

8. In an automatic phonograph, in combination, a generally horizontal turntable, a magazine adapted to support a stack of records in substantially vertical position, said magazine including supports for the records which slope downwardly towards the turntable and abutment means for holding the lower end of the outermost record at a definite position on said supports, whereby the lower ends of the records of said stack are adapted to slide downwardly towards the turntable along said supports to bring the outermost record into a definite position in engagement with said abutment means, a gripping frame adapted for pivotal movement between said position and said turntable, and means for swinging said frame into engagement with the outermost record in said definite position on said supports and into substantially horizontal position above said turntable.

9. In an automatic phonograph, in combination, a generally horizontal turntable, a magazine adapted to support a stack of records in substantially vertical position, said magazine including supports for the records which slope downwardly towards the turntable and abutment means adjacent the lower ends of said supports, whereby the lower end of said stack is adapted to slide downwardly along said supports to bring the outermost record into engagement with said abutment means, a frame adapted to be located adjacent said record supports, means for swinging said frame into engagement with the outermost record and into substantially horizontal position around said turntable, gripping means on said frame, and means for moving said gripping means into gripping position when the frame is adjacent the outermost record in the magazine and for releasing said gripping means when the frame is in said substantially horizontal position.

10. In an automatic phonograph, in combination, a turntable, a record-carrying frame adapted to move from one side of said turntable to another side of said turntable and vice-versa, gripping means for supporting a record on one side of said frame, means pivotally supporting said frame for moving the same in opposite directions into a position substantially parallel with the turntable, means for swinging said frame beyond the turntable when said frame is located on one side of the turntable and for swinging the frame in the opposite direction to a position above the turntable when the frame is on the other side of said turntable, and means for releasing said gripping means when the frame is adjacent the turntable in both cases.

11. In an automatic phonograph, in combination, a turntable, a record-carrying frame adapted to move from one side of said turntable to the other side of said turntable and vice-versa, gripping means for supporting a record on one side of said frame, means pivotally supporting said frame for moving the same in opposite directions into a position substantially parallel with the turntable, means for swinging said frame in one direction past the turntable when the frame is located on one side of the turntable, means for releasing said gripping means during said swinging to release the record for support upon the turntable, means for swinging the frame in the opposite direction to a position above the turntable when the frame is on the other side of said turntable, and means for releasing said gripping means when the frame is above the turntable to permit the record to drop onto the turntable in inverted condition.

12. In an automatic phonograph, in combination, a turntable, a magazine adapted to receive a stack of records located to one side of said turntable, a magazine adapted to receive played records and located to another side of said turntable, a swinging frame adapted to receive a record from first said magazine, gripping means on said frame for holding said record on one side of said frame, means for swinging said frame to a position beyond the turntable, means for releasing said gripping means to permit the record to rest upon the turntable free of said frame, means for swinging said frame into inverted position above the turntable, means for actuating said gripping means to release the record onto the turntable, and a second swinging frame adapted to remove the played record from the turntable and to convey it to second said magazine.

13. In an automatic phonograph, in combination, a turntable, a magazine adapted to receive a stack of records located to one side of said turntable, a magazine adapted to receive played records and located to another side of said turntable, a swinging frame adapted to receive a record from first said magazine, gripping means adapted to hold a record on one side of said swinging frame, means for swinging said frame into a position around the turntable, means for disengaging said record from said frame to permit it to rest freely upon the turntable for the playing of such record, means for swinging said frame upwardly to remove the record from the turntable, means for causing said gripping means to engage the record, means for swinging said frame across the turntable, means for swinging said frame downwardly in the opposite direction towards the turntable, means for actuating the gripping means to release the record, whereby the same is permitted to rest upon the turntable in inverted condition, and record-removing means adapted to remove the record from the turntable and convey it to second said magazine.

14. In an automatic phonograph, in combination, a generally horizontal turntable, a magazine located to one side of said turntable and adapted to receive a stack of records to be played thereon, a frame adapted to receive a record from said magazine, gripping means on said frame adapted to hold said record on one side of said frame, means for swinging said frame about a horizontal axis towards the turntable to place said record thereon, means for actuating the gripping means to release the record onto the turntable, means for raising said frame upwardly about said axis to remove the record from the turntable, means for causing the gripping means to engage the record, means for swinging said frame about a vertical axis across the turntable, means for swinging said frame downwardly in the opposite direction towards the turntable, means for actuating said gripping means to supply said record to the turntable in inverted condition, a magazine adapted to receive played records from said turntable, a swinging frame adapted to be swung to remove the played record from said turntable, and means for actuating last said frame to effect said removal and to transfer the played record to last said magazine.

15. In an automatic phonograph, in combination, a generally horizontal turntable, a magazine adapted to support a stack of records in substantially vertical position, said magazine including supports for the records which slope downwardly towards the turntable and abutment means for holding the lower end of the outermost record at a definite position on said supports, whereby the lower ends of the records of the stack are adapted to slide downwardly along said supports to bring the outermost record into engagement with said abutment means, a swinging frame adapted to swing into engagement with the outermost record, and resilient means for thus moving said frame into contact with said stack whereby the outermost records may be engaged at a plurality of angular positions in said magazine.

16. In an automatic phonograph, in combination, a generally horizontal turntable, a magazine adapted to support a stack of records in substantially vertical position, said magazine including supports for the records which slope downwardly towards the turntable and abutment means for holding the lower end of the outermost record at a definite position on said supports, whereby the lower ends of the records of the stack are adapted to slide downwardly along said supports to bring the outermost record into engagement with said abutment means, a swinging frame adapted to swing into engagement with the outermost record, resilient means for thus moving said frame into contact with said stack whereby the outermost records may be engaged at a plurality of angular positions in said magazine, gripping means on said frame adapted to engage the outermost record, and means for actuating said gripping means to gripping position after the frame has engaged the outermost record.

17. In an automatic phonograph, in combination, a generally horizontal turntable, a magazine adapted to support a stack of records in substantially vertical position, said magazine including supports for the records which slope downwardly towards the turntable and abutment means for holding the lower end of the outermost record at a definite position on said supports, whereby the lower ends of the records of said stack are adapted to slide downwardly along said supports to bring the outermost record into engagement with said abutment means, a frame adapted to be located adjacent said record supports, and means including resilient means for swinging said frame into engagement with the outermost record, and means for swinging said frame into substantially horizontal position adjacent said magazine.

18. In an automatic phonograph, in combination, a turntable, a record-carrying frame, means providing a horizontal pivotal axis for said frame, said frame being adapted to move about said pivotal axis in two directions from a vertical position into substantially horizontal positions, means for locating first said means and said frame bodily on one side of said turntable and on another side of said turntable, means for moving said frame downwardly towards the turntable in one or the other of said directions from one or the other of said locations to apply a record thereto in relatively inverted positions, gripping means on said frame adapted to secure the record thereto, said gripping means comprising elements for locating records of different sizes in the same axial position on said frame, said frame and its mounting means being arranged to locate the record in axial alignment with the turntable when the frame is substantially in either of said horizontal positions, and means for releasing said gripping means when the frame is substantially in either horizontal position to effect application of the record to the turntable in either of said relatively inverted positions.

19. In an automatic phonograph, in combination, means for supporting a stack of records, a record-carrying frame, means for moving said frame close to the supporting means and into contact with the outermost record of said stack, a record gripping element on said frame adapted to clear an outermost record of a smaller size when the frame is moved into engagement with the stack, a second record gripping element on said frame adapted to clear an outermost record of larger size when the frame is moved into engagement with the stack, first said gripping means being located within the periphery of an outermost record of larger size when said frame is moved into engagement with the stack, resilient means for mounting the first said record gripping element, whereby an outermost record of larger size displaces same away from the stack when the frame approaches such larger outermost record on the stack, and a third record gripping element on said frame adapted to move the outermost record towards one of the first said gripping elements.

20. In an automatic phonograph, in combination, magazine means for supporting a stack of records, a record-carrying frame adapted to move into engagement with the outermost record of said stack, two separate gripping means on said frame adapted to cooperate selectively with records of different sizes and a common gripping means adapted to move the outermost record into engagement with one of first said record gripping means, a player arm, means for moving said player arm into initial playing position, and means controlled by said common gripping means for predetermining said initial position for records of different sizes.

21. In an automatic phonograph, in combination, a turntable, magazine means on one side of said turntable for supporting a stack of records, magazine means on another side of said turntable for receiving played records, a record-carrying swinging frame adapted to be positioned adjacent first said magazine to receive a record therefrom, and adapted to move across the turntable to a remote position, means for swinging said frame from its position adjacent first said magazine and from said remote position towards the turntable to apply records thereto in relatively inverted positions, and means independent of said frame for removing a played record from the turntable and transferring it to second said magazine means.

22. In an automatic phonograph, in combination, a turntable, magazine means on one side of said turntable for supporting a stack of records in substantially vertical position, magazine means on another side of said turntable for receiving played records and adapted to support said records in substantially vertical position, a record-carrying swinging frame adapted to be positioned adjacent first said magazine to receive a record therefrom and adapted to move across the turntable to a remote position, means for swinging said frame from its position adjacent first said magazine and from said remote position towards the turntable to apply records thereto in relatively inverted positions, and means independent of said frame for removing a played record from the turntable and transferring it to second said magazine means.

PAUL F. WILBER.